(12) United States Patent
Alam et al.

(10) Patent No.: US 7,536,695 B2
(45) Date of Patent: May 19, 2009

(54) ARCHITECTURE AND SYSTEM FOR LOCATION AWARENESS

(75) Inventors: Mohammad Shabbir Alam, Redmond, WA (US); Warren Vincent Barkley, Mill Creek, WA (US); Timothy M. Moore, Bellevue, WA (US); Geoffrey E. Pease, Kirkland, WA (US); Steven A. N. Shafer, Seattle, WA (US); Florin Teodorescu, Redmond, WA (US); Yinghua Yao, Bellevue, WA (US); Madhurima Pawar, Bellevue, WA (US); John C. Krumm, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 660 days.

(21) Appl. No.: 10/402,609

(22) Filed: Mar. 28, 2003

(65) Prior Publication Data

US 2004/0193707 A1 Sep. 30, 2004

(51) Int. Cl.
*G06F 9/46* (2006.01)
*G06F 9/54* (2006.01)
*H04W 68/08* (2009.01)

(52) U.S. Cl. ............... 719/313; 709/224; 455/456.1
(58) Field of Classification Search ............... 719/313; 709/224; 455/456.1
See application file for complete search history.

(56) References Cited

U.S. PATENT DOCUMENTS

| | | | |
|---|---|---|---|
| 5,696,799 A * | 12/1997 | Kainulainen | 375/356 |
| 5,699,431 A * | 12/1997 | Van Oorschot et al. | 380/30 |
| 6,198,914 B1 | 3/2001 | Saegusa | |
| 6,684,250 B2 * | 1/2004 | Anderson et al. | 709/225 |
| 6,768,994 B1 * | 7/2004 | Howard et al. | 707/10 |
| 6,845,241 B2 * | 1/2005 | Edlund et al. | 455/456.1 |
| 6,920,440 B1 * | 7/2005 | Barson | 706/21 |

(Continued)

FOREIGN PATENT DOCUMENTS

WO WO 01/69951 A1 9/2001

(Continued)

OTHER PUBLICATIONS

Ratnam et. al., A Fully Distributed Location Management Scheme for Large PCS.*

(Continued)

*Primary Examiner*—Li B Zhen
(74) *Attorney, Agent, or Firm*—Wolf, Greenfield & Sacks, P.C.

(57) ABSTRACT

A location service and method provides a location aware computing device that is extensible by allowing different types of location awareness providers operate with the service. The method includes receiving a request for a location context, acquiring data associated with a current location from one or more location detection devices, reconciling the acquired data for any inconsistencies concerning the current location by applying either or both of a hierarchical and a metric process, and generating a location object accessible to applications. The service includes a location management component configured to route location data, a fuser engine configured to receive one or more location reports generated from the location data, reconcile conflicts between the location reports and generate a location object, and one or more location application programming interfaces (APIs) coupled to the location management component to transmit the location object from the fuser engine to an application.

40 Claims, 12 Drawing Sheets

U.S. PATENT DOCUMENTS

| | | | |
|---|---|---|---|
| 6,950,876 B2* | 9/2005 | Bright et al. | 709/230 |
| 6,952,712 B2* | 10/2005 | Yoshimura et al. | 709/201 |
| 2001/0047407 A1* | 11/2001 | Moore et al. | 709/223 |
| 2002/0143991 A1* | 10/2002 | Chow et al. | 709/245 |
| 2003/0182394 A1* | 9/2003 | Ryngler et al. | 709/217 |

FOREIGN PATENT DOCUMENTS

WO     WO 02/17075 A2     2/2002

OTHER PUBLICATIONS

*Bluetooth Positioning*, Bluesoft, Inc., 2, at http://www.bluesoft-inc.com/bluetooth.asp (last visited Jun. 10, 2003).

*Aeroscout WLAN Location System*, Bluesoft, Inc., 1, at http://www.bluesoft-inc.com/wlan.asp (last visited Jun. 10, 2003).

*Wireless Security*, Bluesoft, Inc., 1, at http://www.bluesoft-inc.com/security.asp (last visited Jun. 10, 2003).

*Ekahau Positioning Engine 2.0*, Ekahau, 2, at www.ekahau.com (last visited Jun. 10, 2003).

*Ekahau Positioning Engine 2.0*, Ekahau, 2, at http://www.ekahau.com/products/positioningengine/ (last visited Jun. 10, 2003).

European Search Report from corresponding European Application No. 04007400.7, filed Mar. 26, 2004.

* cited by examiner

ARCHITECTURE AND SYSTEM FOR LOCATION AWARENESS

FIELD OF THE INVENTION

This invention relates generally to computer systems and, more particularly, relates to location awareness of computer systems and computer devices.

BACKGROUND OF THE INVENTION

With the advent of the Internet and the growth of interactive applications available to computer users comes an increasing need for ubiquitous computing. In this context, ubiquitous computing means the ability of computers to affect most of a user's daily tasks. Computers are called "computers" because of their ability to "compute" or perform mathematical tasks. Computers are no longer seen as only computing machines, but are personal companions that are blending into the fabric of society in the form of personal digital assistants (PDAs) and personal information managers (PIMs), high functioning cellular phones and the like.

Computers no longer take up the space of an office to be able to compute pi to the $20^{th}$ decimal place and, instead, fit into the palm of a hand with the same computing power. Software developers cognizant of the personal companion persona of newer computing tools create user-friendly applications making the computing aspect of computers nearly invisible to users. Such technology results in user interfaces closely resembling human-type interfaces in sharp contrast to prior art computer-readable punch cards required in the past. Another growing technology affecting the ubiquitous nature of computing is wireless technology. Increasing growth of wireless and wired communication networks and the newer types of wireless networks create a need for computers to take advantage of the communication abilities of computers. Wireless no longer means a cellular phone that must be hard-wired within a vehicle, as was known in the past. Modern lithium-ion type batteries and other small but powerful batteries enable cellular phones, PIMS, PDAs and notebook computers to operate for hours at a time without requiring recharging. The long-term operation of computing devices enables a user to move from place to place without concerns of recharging looming while using a device. However, the long-term operation by a user creates opportunities for development of new computing products heretofore not fathomed as being necessary or even possible. One type of new computing product can be referred to as a location awareness product type.

Current location awareness devices are fragmented, do not work together and are not extensible or unified. For example, global positioning systems, home networking systems, local area networks (LANs) and wireless phones connected to a computing system all are capable of providing location data to a computer system. There is no common denominator between these systems allowing synergistic utilization of the location data. Each device outputs location data in different formats. What is needed, therefore, is a location awareness system that allows for synergy among location awareness products to enhance a user's experience with a computer system.

BRIEF SUMMARY OF THE INVENTION

Accordingly, The location service provides an extensible method of providing location information that is agnostic to the provider of the information and the technology used to provide that information. The method is directed to receiving a request for a location context of the computing device, acquiring data associated with a current location from one or more location detection devices, reconciling the acquired data for any inconsistencies concerning the current location, and generating a location object accessible to applications. The service reconciles the acquired data by in a plurality of methods, for example, by applying either or both of a hierarchical and a metric process To perform the method, an appropriate service includes a location management component configured to route location data, a fuser engine coupled to the location management component to receive one or more location reports generated from the location data, by, for example, providers of the data and software configured to resolve any conflicts concerning the data, reconcile conflicts between the location reports and generate a location object; and one or more location application programming interfaces (APIs) coupled to the location management component to transmit the location object from the fuser engine to an application. The location object dynamically provides to the application a latest available location context for a computer running the service.

Additional embodiments are directed to security and privacy issues for the service. For example, a user or default settings can determine trustworthiness of a provider of acquired data. A provider that provides a digital signature, is from a known source or is trusted by a user can be set as a more trustworthy provider of location data. Additionally, separate security and privacy frameworks are configured to prevent third party code from compromising security of the location service and prevent applications from accessing the service if appropriate privacy policies are not in place.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, can be best understood from the following detailed description taken in conjunction with the accompanying drawings of which:

DETAILED DESCRIPTION OF THE INVENTION

Figure 1:
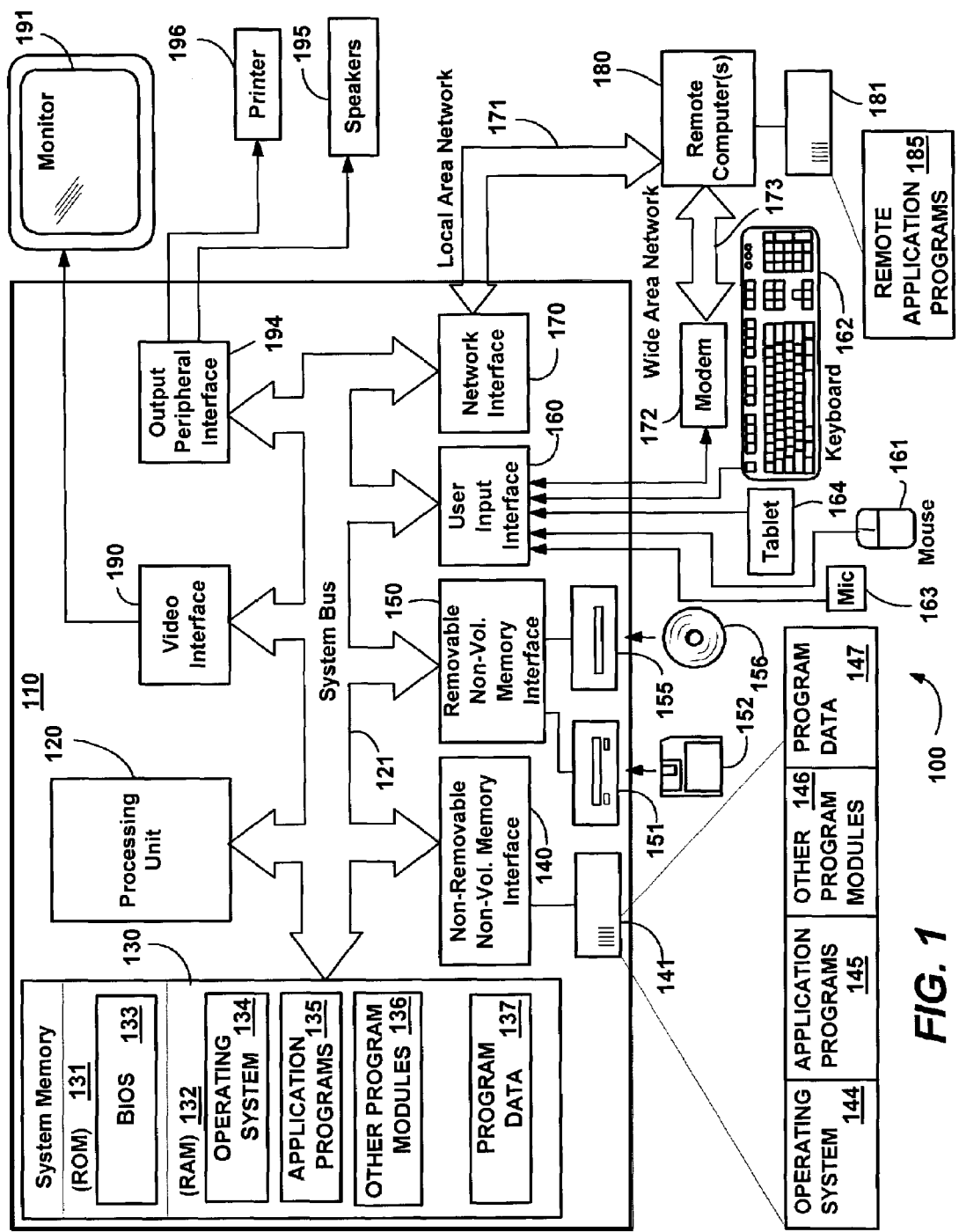
FIG. 1 is a block diagram generally illustrating an exemplary computer system in which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
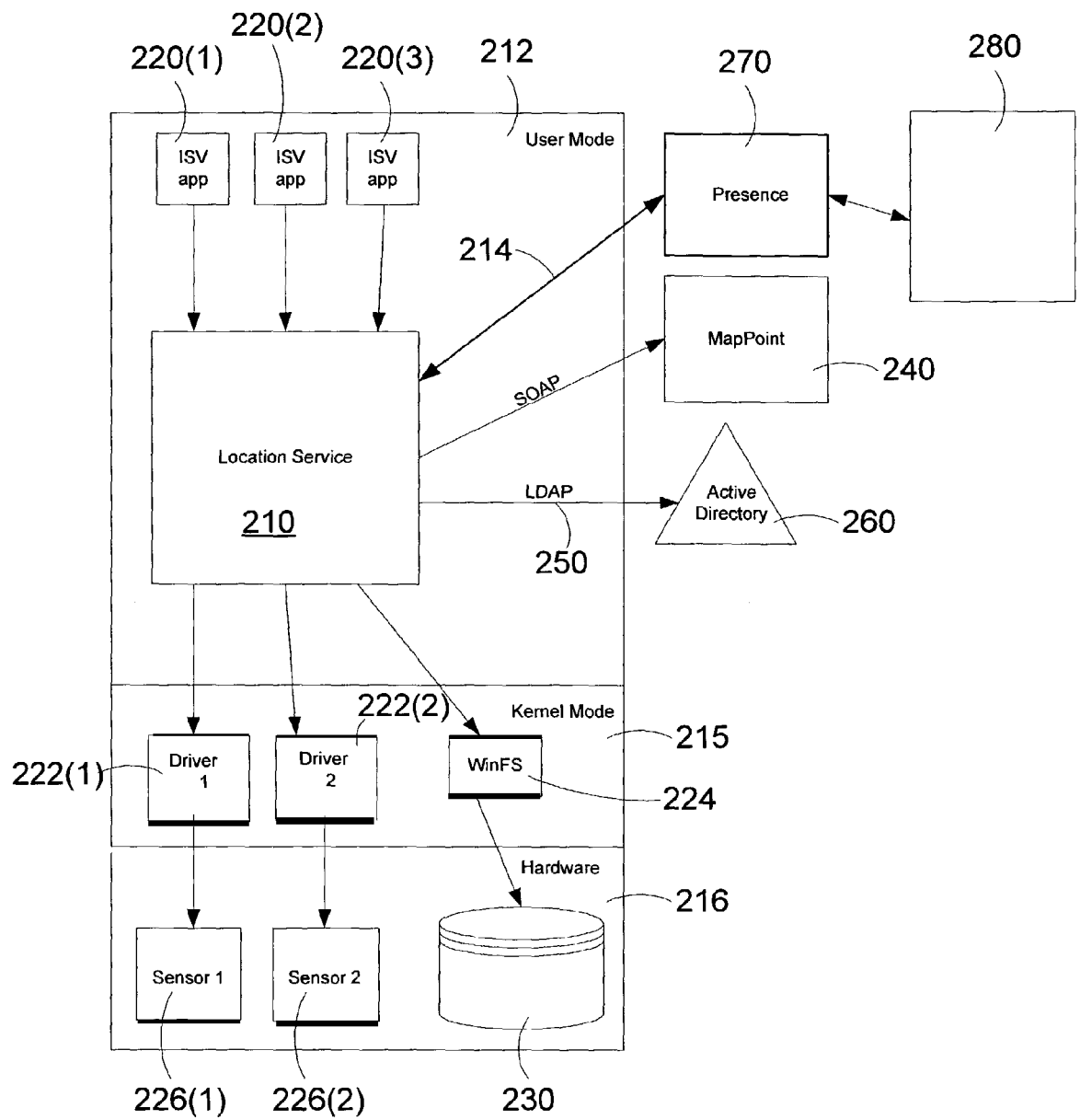
FIG. 2 is block diagram of an exemplary location aware architecture in accordance with an embodiment of the present invention.

Referring to FIG. 2, an exemplary overview block diagram illustrates an architecture for a location aware service 210. As shown, the location service 210 can be a user mode service 212 and can be installed on a computer, such as computer 110 or on a handheld computing device. Location service 210 receives data from a plurality of applications 220(1-3) and from outside the device/computer 214. Location service 210 is coupled within the device to kernel mode 215 component such as drivers 222(1-2) and a Windows® file system component 224. The drivers 222(1-2) and Windows® file system component 224 are shown coupled to hardware 216. Each device driver 222(1-2) is shown coupled to its respective hardware device 226(1-2). Windows® file system component 224 is shown coupled to a memory device 230, which could be a database for holding Window® file system data. Location Service 210 can also be coupled to a MapPoint® application or other application configured to query for location information and consistent with embodiments herein, or device 240 to provide location data. Location service 210 is also coupled to active directory 260 via lightweight directory access protocol (LDAP) 250. Location Service 210 can also be coupled to an outside device/client 280, which could be coupled to a presence server 270 via a communication channel 214. More particularly, location service 210 could provide location information capable of being retrieved by, for example, a real time communication (RTC) client. The RTC client could then transmit the information to presence server 270.

Figure 3:
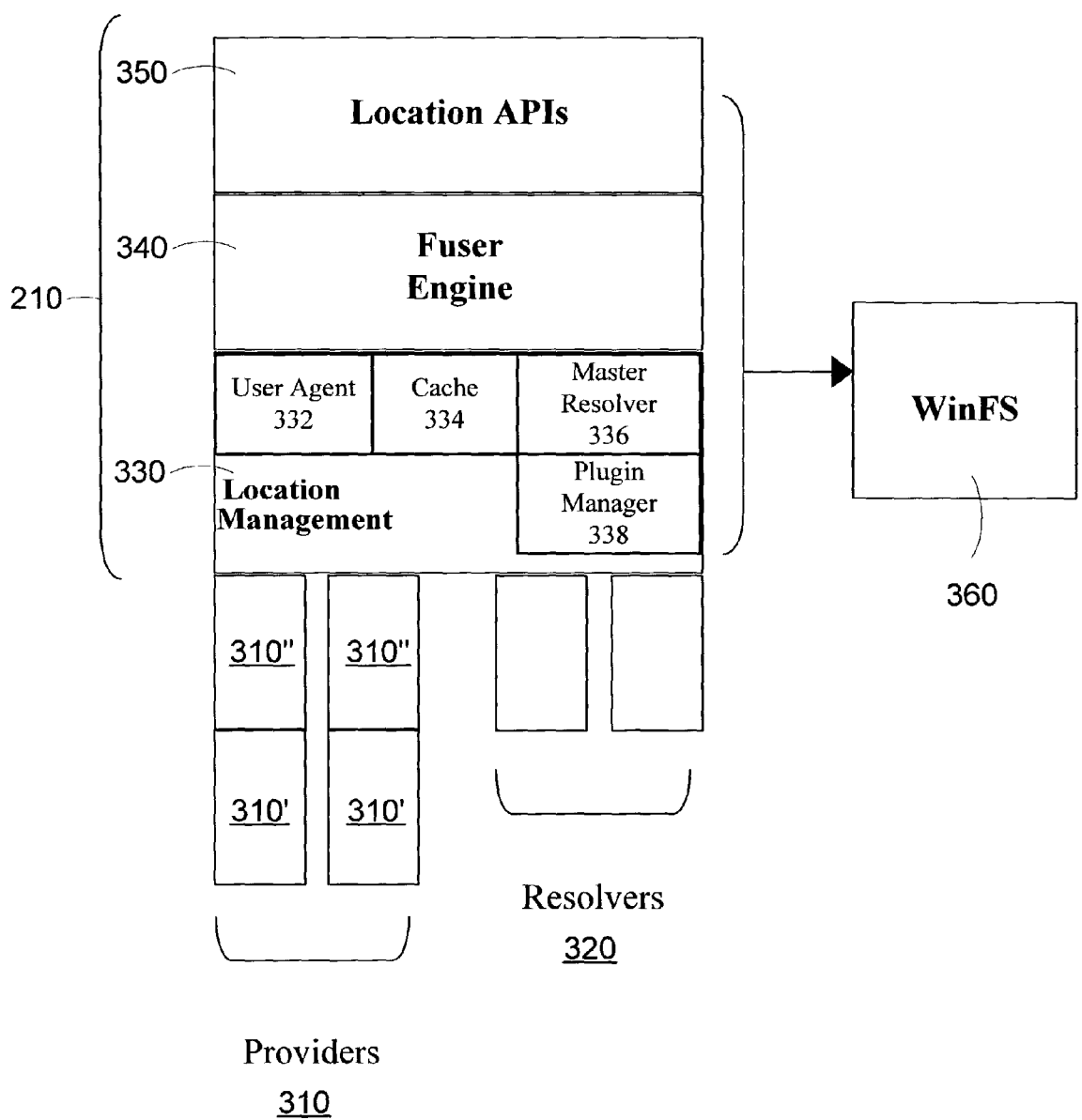
FIG. 3 is a block diagram of a location service within a location aware architecture in accordance with an embodiment of the present invention.

Referring now to FIG. 3, a block diagram illustrates location service 210 in further detail. As shown, the location service 210 includes one or more location application programming interfaces (APIs) 350, a fuser engine 340 and a location management component 330. The location management component 330 interacts with provider plugins 310" and resolvers 320. In one embodiment, location management component 330 includes a user agent 332, a cache 334, a master resolver 336 and a plugin manager 338. FIG. 3 also illustrates providers 310', which can be providers of sensed data that require at least some interpretation, such as sensor-specific data. For example, a global positioning provider can provide a latitude and a longitude. In one embodiment, providers 310' transmit sensed data to provider plugins 310" as device-specific location information or sensor-specific data from devices. Provider plugins 310" can normalize the data, translate the data into a standard form, and transmit the data to location management component 330. In other embodiments, providers 310' are capable of translating the data prior to transmitting the data to provider plugins 310". The capabilities of the providers 310' are subject to design requirements and limitations. For example, location management component 330 can obtain raw device information from one or more devices via providers 310' or other sources. In an embodiment, location management component 330 normalizes the data, and translates the data into location reports.

In one embodiment, location management component 330 is configured within location service 210. Provider plugins 310" normalize the data, however, the plugin manager 338 which is part of the location management system will further normalize the data before accepting it and passing it to master resolver 336. Each of the components: master resolver 336, fuser engine 340, plugin manager 338 indicate readiness to accept information. Thereafter, in one embodiment, applications and components that retrieve data do so only when components 336, 338 and 340 have data ready to be retrieved.

Resolvers 320 receive the sensed and translated data or, in some cases, raw location data, such as device specific location information, and interpret the data. Resolvers 320 can be implemented as plugins to location service 210 and can include device specific location information translators and data sources. Resolvers 320 function to translate device specific location information to rich location information by using data sources available to infer new data from existing data. In one embodiment, a resolver 320 can translate at least a portion of the data received from one or more devices. Each resolver 320 could be capable of interpreting at least one type of raw or partially decoded data from a provider 310. For example, a resolver 320 could be dedicated to interpreting only 802.11 type data. The resolver would then register with location management 330 as interpreting only 802.11 type data and would receive only that type of data. Additionally, each resolver 320 can be configured to translate information of another resolver, in which case the resolver might not be capable of translating raw data or partially decoded data. FIG. 3 also shows Window® file system component 360 that receives data from location service 210.

Fuser engine 340 generates a current location object. Location service 210 checks current location data via a plugin or several plugins, including provider plugins 310" and resolver plugins 320. In this context, a plugin can be implemented as one or more dynamically loadable libraries or dynamic link libraries (DLLs) or other dynamically loadable module capable of expanding the capabilities of software, firmware, or system components.

System Overview

Figure 4:
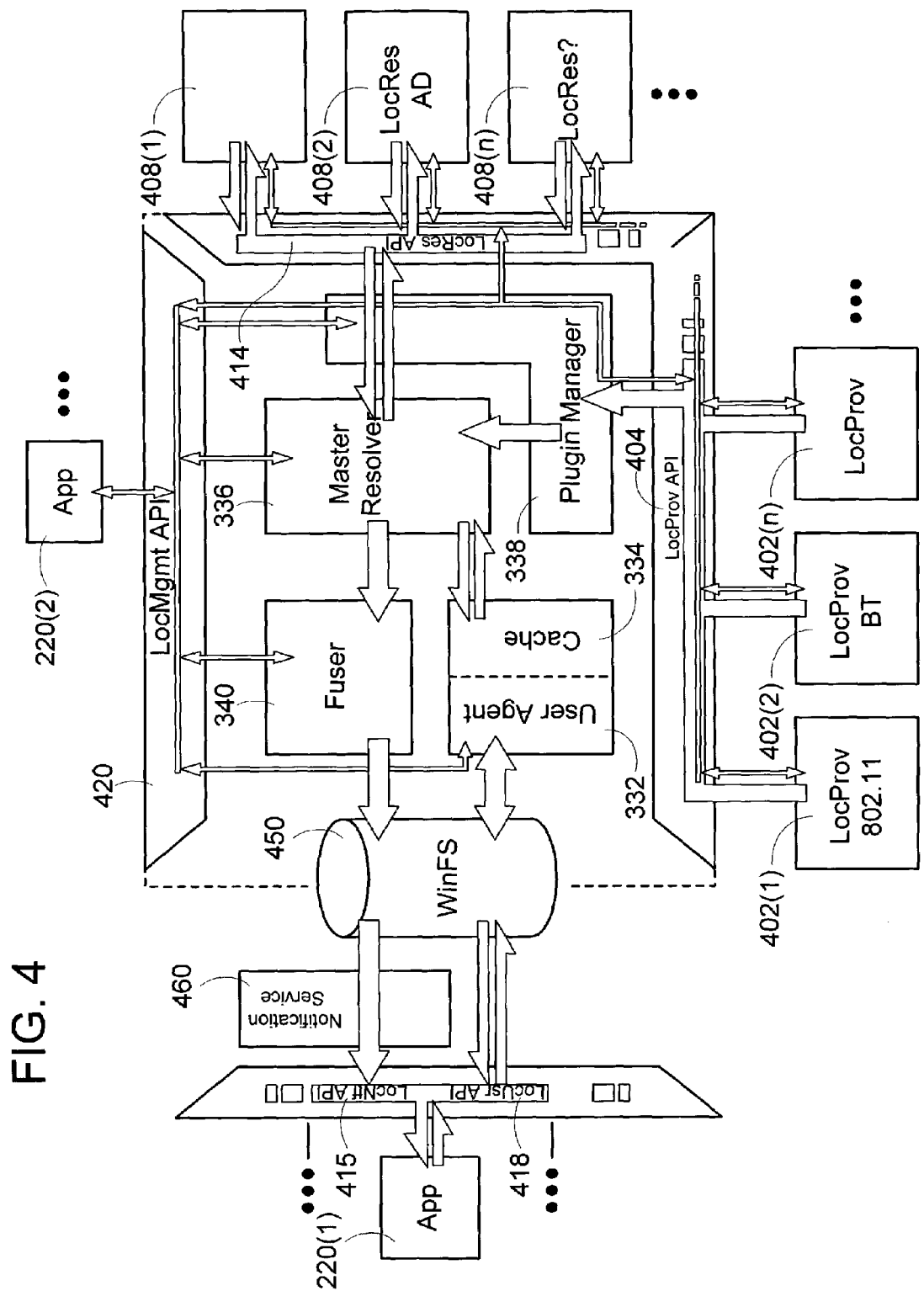
FIG. 4 is a block diagram showing exemplary connections of the location aware system including application programming interfaces in accordance with an embodiment of the present invention.

Referring now to FIG. 4, a block diagram of location system 210 and surrounding components in general illustrates that location service 210 acts as a framework agnostic of any applications, and agnostic as to devices and data sources from which information is obtained. Location service 210 is shown including fuser engine 340, a cache 334, user agent 332, a plugin manager 338 and master resolver 336. Location service 210 further includes WinFS SQL server 450, location provider API 404, location resolver API 414, location notification API 416, location user API 418, and location management API 420. WinFS SQL server 450 couples location service 210 to a notification service 460 and to a user notification API LocUsr 418 and a location notification API 416. APIs 416 and 418 can interact with an application 220.

Location user API 418 allows an application to query for the current location of the computer running location service 210. Location resolver API 414 specifies what functions need to be implemented by a plugin in order to register with the service. As shown, location user API 418 receives data from WinFS server 450 and passes the data to one or more applications 220(1-n). Location management API 420 receives data from a plurality of locations such as fuser engine 340, user agent 332, cache 334, plugin manager 338 and master resolver 336 and passes data back and forth to one or more applications 220. Location management API 420 allows the parameters of the service and components to be configured. Location management API 420 also allows providers and resolvers to be added and removed. Location notification API 416 receives data from notification service 460 and passes data to applications 220. Location notification API 416 allows an application to register to be notified when the location of the computer running the service has changed. In one embodiment, a separate API, an application registration API allows applications to register for notifications and determining a current location. In the embodiment, applications must first register to obtain location data. Once registered, an application can choose to be notified for predetermined reasons. Location resolver API 414 sends and receives data from plugin manager 412 and master resolver 336 and transmits the data to location resolver user/Windows® database 408(1), location resolver Active Directory 408(2), and location resolver MapPoint® 408(3), as well as other location resolvers that could benefit from the location data. Master resolver 336 is responsible for managing the resolution of location information. When plugin manager 412 passes to master resolver 336 device-specific location information, master resolver 336 routes the data to the resolvers that are both free and able to resolve the information.

Specifically, referring to FIG. 4, the flow through location service 210 can be described by an example, beginning with providers 402. A provider, for example, an 802.11 provider obtains scan data. If the provider 402 determines that there are new access points, the provider bundles the media access control (MAC) address and signal strength information into an 802.11 report. The 802.11 provider signals that information is ready for plugin manager 338. Plugin manager 338 picks up the sets of information and signals master resolver 336 that there is a new location report to be resolved.

Next, master resolver 336 retrieves the location report from plugin manager 338. Next, master resolver 336 passes the location report to user agent 332.

User agent 332 checks cache 334 for this location report. Cache 334 possibly returns a miss. If so, cache 334 caches the data and checks a backend. By checking the backend of cache, a user's location could be determined based on the location report. If cache does not determine the user's location, user agent 332 generates a miss.

After user agent 332 generates a miss, master resolver 336 passes the location report to a resolver 408, such as active directory (AD) resolver 408(2). AD resolver 408(2) locates the MAC address information in the location report, connects to Active Directory and finds the location of the access point. Next, AD resolver 408(2) returns the location of the access point to master resolver 336 as a location report. Next, master resolver 336 passes the location report to user agent 332. User agent 332 checks cache 334 for a match with the location report returned by AD resolver 408(2). If cache 332 generates a miss, user agent 332 caches the AD report. Next, user agent 332 then checks WinFS 450 to find any saved locations that relate to the location report generated by AD resolver 408(2). If nothing is found, user agent 332 informs master resolver 336 that there is no additional data. Next, master resolver 336 signals to fuser engine 340 that there is data to be retrieved. Fuser engine 340 retrieves two location reports, including an 802.11 location report and an AD location report.

Next, fuser engine 340 fuses these reports and writes a location object representing the fused reports, and both the location reports into WinFS 350 as the current location.

Next, notifications service 460, which can be configured to run on top of WinFS generates a notification. The generated notification passes through a location notification API and onto the applications registered for the notification. 100491 Location resolver API 414 is an interface between location service 210 and resolvers. Further, location resolver API 414 allows each resolver to notify the location service 210 that a resolver has new location information. Location resolver API 414 enables the resolver to transfer this information to location service 210.

Location provider API 404 sends and receives data from location providers as providers 402(1-n) which can include an 802.11 provider, a Bluetooth provider, a global positioning system provider and other types of providers of location data. Location provider API 404 is an interface between location service 210 and providers. Location provider API 404 allows each provider to notify the service that it has new location information and transfers this information to the service.

In one embodiment, location provider API 404 and location resolver API 414 are both part of a plugin manager API. Plugin manager API further includes a plugin manager plugin, which is an interface between plugin manager 338 and a provider plugin 402. The plugin manager plugin interface provides data to both provider and resolver interfaces. According to the embodiment, to be a provider 402, both location provider API and a plugin manager plugin must be implemented.

Fuser engine 340 functions to fuse data obtained from master resolver 336. Fuser engine 340 generally resolves conflicts and unifies "reports" received from different resolutions of location awareness received from location providers. The data regarding location arrives via master resolver 336 that filters the data and transmits the data to cache 334 and then to fuser engine 340.

User agent 332 functions to check cache 334 to determine whether the current location reports may be resolved further using cached data. User agent 332 further checks WinFS 450 to see if the current location reports indicate a location that a user has saved.

Cache 334 functions to store resolution trees. Resolution trees allow location service 210 to reduce the number of resolution cycles.

FIG. 4 illustrates an embodiment of an architecture that can use location service 210 to provide applications 220 with the ability to query for a current location and the ability to be notified when the location of a user has been changed. FIG. 4 also illustrates that location APIs 350 are in three layers. Specifically, the APIs provide layers including providers 402 to location service 210, resolvers 408 to location service 210, and applications 220 to location service 210.

In one embodiment, resolver plugins 408 are configured to register types of information that resolver plugins 408 can translate and other capabilities. The data concerning the translatable types of information and other capabilities enables location service 210 to efficiently use resolver plugins 408 to perform processes that would otherwise be performed elsewhere and cause duplicative processing. Further, registration allows fuser engine 340 to efficiently resolve conflicts in data with known types and provide an event mechanism that allows applications 220 to be notified when the users location has changed. The registration and other processes within location service 210 further enables an instantiation of a location object associated with location 210 to pass all the location information to an application 220 as an extension of a location object. The location object can be configured to be a generic type of location information component that enables any application to insert different or new types of location information into the component. The generic type of location information component can be configured, for example, to be an extension of a basic location report.

In an embodiment, location service 210 is extensible such that developers can write additional plugins. As shown, plugins 402, 408 can be coupled to the location service 210 via layers of APIs 414, 416, 418, 420, 422 that enable the location service 210 to coordinate communication between devices and data sources and new types of location data. Additionally, each plugin 402, 408 and component within location service 210 can be configured to be modular such that one or more plugins or components can be disabled or removed without causing an error to occur. In this embodiment, location service 210 operates as if the disabled/removed plugin, fuser engine 340 or notification component and other component were there but location service 210 skips any portion of a process requiring the removed plugin or component. For example, if fuser engine 340 were disabled, according to the embodiment, location service 210 can route location reports and location reports from the plugins to location user API 418.

In another embodiment, one of applications 220 can be a user control application that could also be implemented as a user interface associated with location service 210. A user control application can further be configured to cooperate or include APIs that allow a user to add/remove plugins, such as plugins 408 and 402, and change priorities on provider plugins 402 and resolvers 498 that can alter the functionality of the fuser engine 340. Additionally, a user control application can be configured to change the number of iterations between master resolver 336 and one or more of the resolvers 408.

Figure 5A:
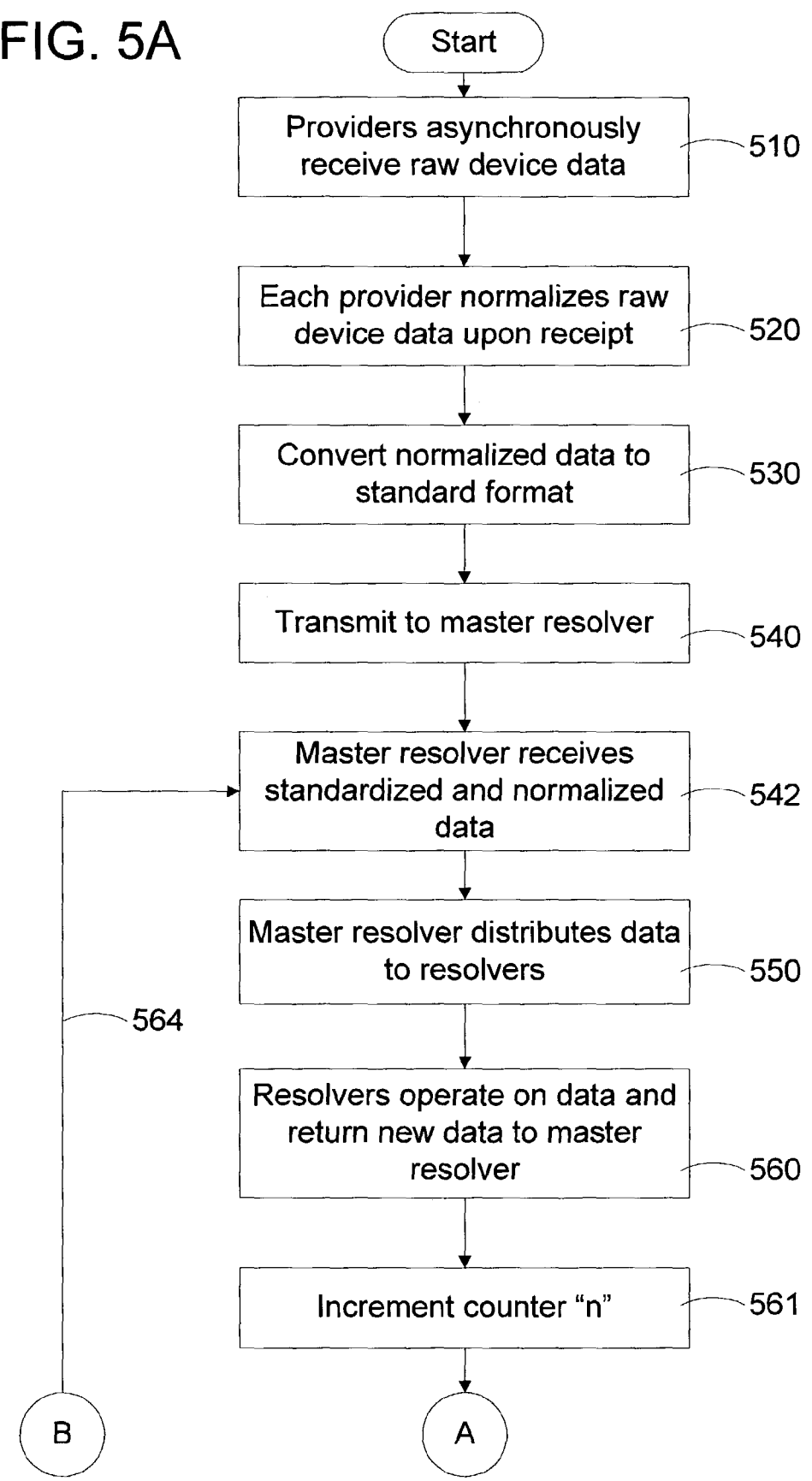
FIGS. 5A and 5B are flow diagrams illustrating a method according to an embodiment of the present invention.
Figure 5B:
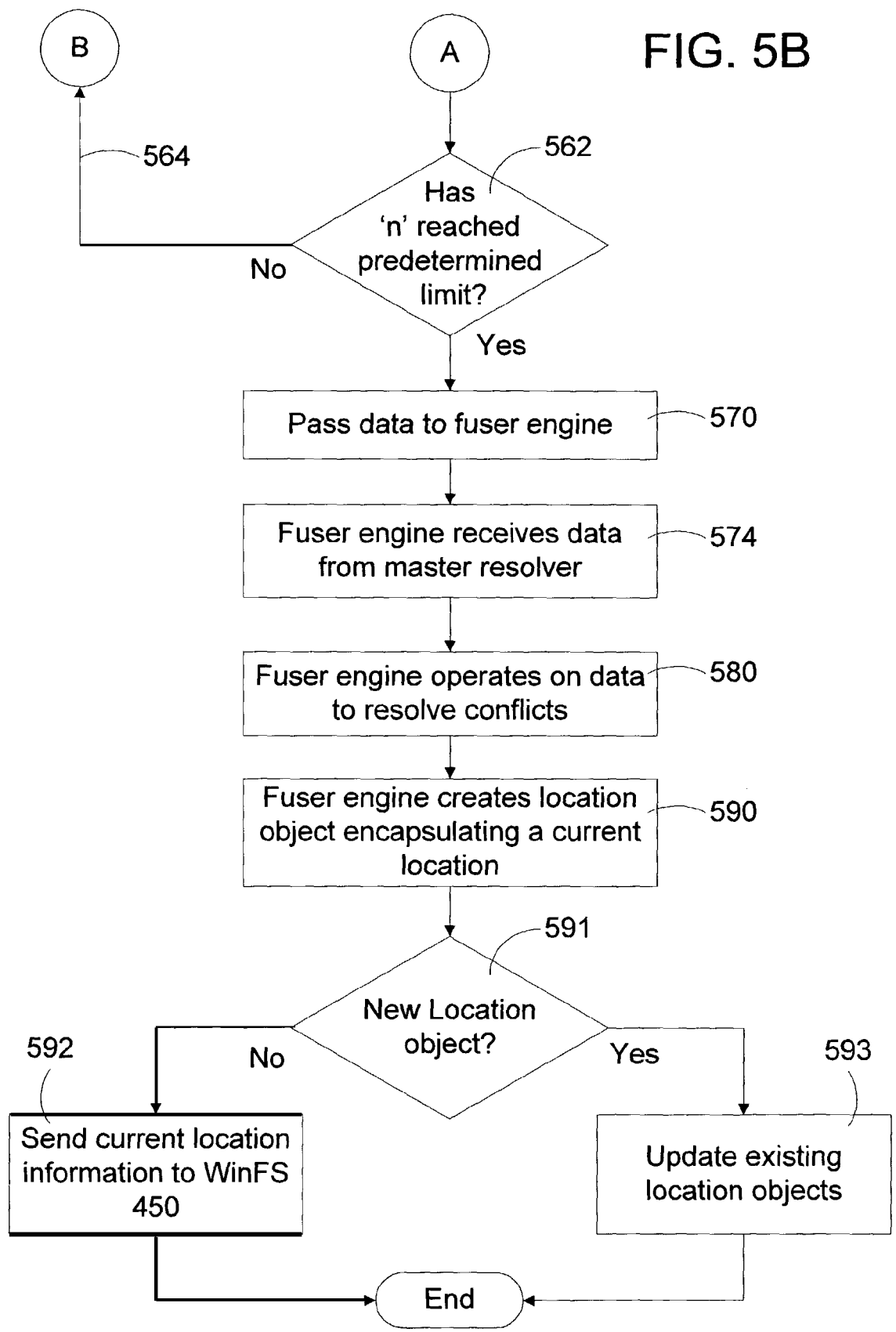

Referring now to FIGS. 5A and 5B in combination with FIG. 4, the internal operation of location service 210 is described. Block 510 provides for providers to asynchronously receive raw device data. Block 520 provides that each provider normalize received data upon receipt. Such normalization causes at least some data to be discarded. Block 530 provides for converting the normalized data to a standard format and block 540 provides for the transmittal of the data to master resolver 336. Block 542 provides for master resolver 336 to receive standardized and normalized data from one or more providers via location provider API 404. Block 550 provides for master resolver 336 to distribute the data to one or more resolvers 408. The resolvers 408 operate on the data and return new data to master resolver 336 as shown in block 560. Block 561 provides for incrementing a counter, such that n becomes "n+1". Decision block 562 then determines whether "n" has reached a predetermined limit. If not, the process then repeats itself as shown by line 564. If the predetermined number of iterations has been reached, or according to a metric or cue received by master resolver 336, data is passed, as shown in block 570, to fuser engine 340.

Block 574 provides that fuser engine 340 receives data from master resolver 336. Block 580 provides that fuser engine 340 operates on the data received from master resolver 336 to resolve conflicts. Block 590 provides that fuser engine 340, after resolving any conflicts, creates a location object that encapsulates a current location of a computer running location service 210. Decision block 591 provides for determining whether a new location object needs to be created. If so, block 592 provides that if fuser 340 has created a new location object, fuser 340 writes the location into WinFS 450. A Block 593 provides that notification service 460 checks any location determined to be a correct location in fuser engine 340 to see if the location matches with any locations for which notification service 340 associates with an application 220. Then, notification service 460 notifies any appropriate applications 220 via location notification API 416. Applications 220 interact with notification service 460 via location notification API 416, first by querying for a location representing location service 210's best guess of a current location of a computer using the service 210. Second, an application 220 can register with notification service 460, which runs in conjunction with WinFS 450, such that application 220 will be notified when the location of a computer running location service 210 has changed. When an application 220 receives location data from location service 210, data returned can include reports from providers 402 as well as reports from resolvers 408. Thus, an application 220 can receive rich data including contextual information added by one of resolvers 408.

In operation, the architecture illustrated in FIG. 4 and described with reference to FIGS. 4 and 5 enables a user, such as a mobile knowledge worker to be task oriented by providing appropriate resources when needed. The architecture provides a method for applications 220 to determine location information. Based on the location information, applications 220 can search through resources available to the user (which can be determined via another feature such as Active Directory, for example) to find the resources near the user.

Regarding a mobile knowledge worker, one example could include a user that travels between several company sites. At each site, the architecture enables applications 220 to assist users locate resources, which could include printers, projectors, whiteboards, scanners and the like. In one embodiment, a mobile knowledge worker can locate a printer for a document by clicking on a location object, such as a "Near Me" object. Location service 210 receives data from providers 402, which are resolved via resolvers, fused by fuser engine 340 and provided via fuser engine 340, WinFS 450 and appropriate location APIs to an application 220. Thus, if one or more printer networks are configured to provide a list of printers and their locations to an application, the application can combine the data to provide a list of printers that are nearby. In one embodiment, the location object is associated via a link enabling a user to click or otherwise indicate one of the printers in the list to print to a chosen printer.

In another exemplary embodiment, a mobile knowledge worker can be a telecommuter or a user of an outside computer other than at a principal place of business, for example, a home office. A home notebook computer, for example, can connect to a home wireless network. According to an embodiment, location service 210 receives data via a provider 402 and transmits to an application visible to the user that indicates the user is connected to a home network. To enable a user to connect to a work location, location service 210 can receive from the user an indication to connect to the work location, for example, via a "My Networks Activity center" or the like. The location service 210, because it receives data that indicates that the user is not connected to a work network, can enable an application to identify a network so that the application can connect to the network, via, for example a network activity center, firewall or the like.

Another example of a mobile knowledge worker benefiting from the disclosure herein can include a plurality of mobile knowledge workers. For example, if one of the plurality of mobile knowledge workers are required, location service 210 enables tracking down at least one of the plurality of mobile knowledge workers. A user requiring one of the plurality of workers can locate a worker by having each worker grant permission to the user allowing a location to be transmitted to a location service 210 running on the user's computer. For example, an application 220, for example, Windows Messenger®, can be configured to receive presence data from each worker for whom the user has permission to do so. Thus, for example, the user can use the data regarding location to decide which worker might be closest, farthest away, and assign tasks accordingly.

Master Resolver

Figure 6:
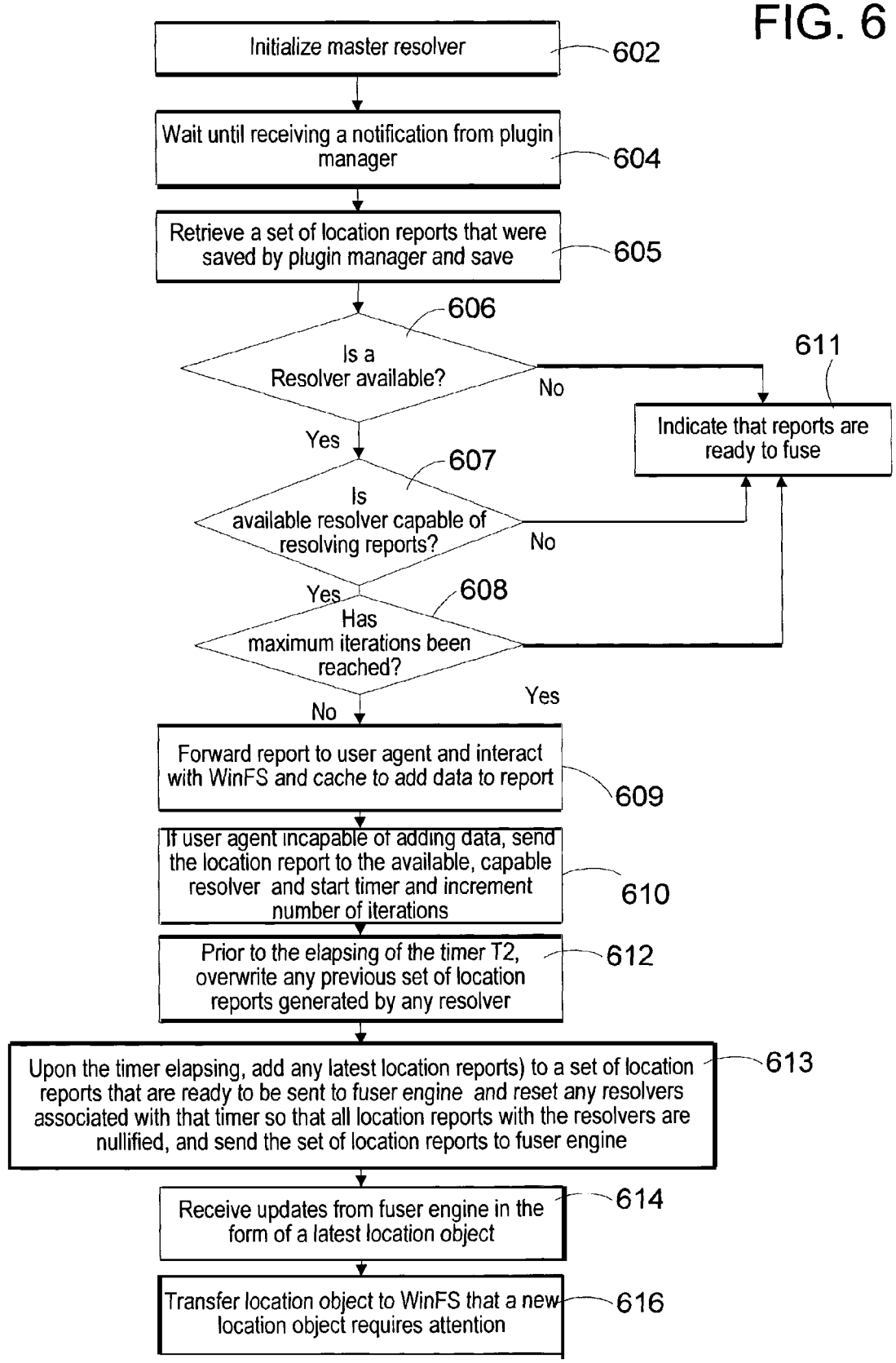
FIG. 6 is a flow diagram illustrating an overview of methods within a location service according to an embodiment of the present invention.
Figure 7:
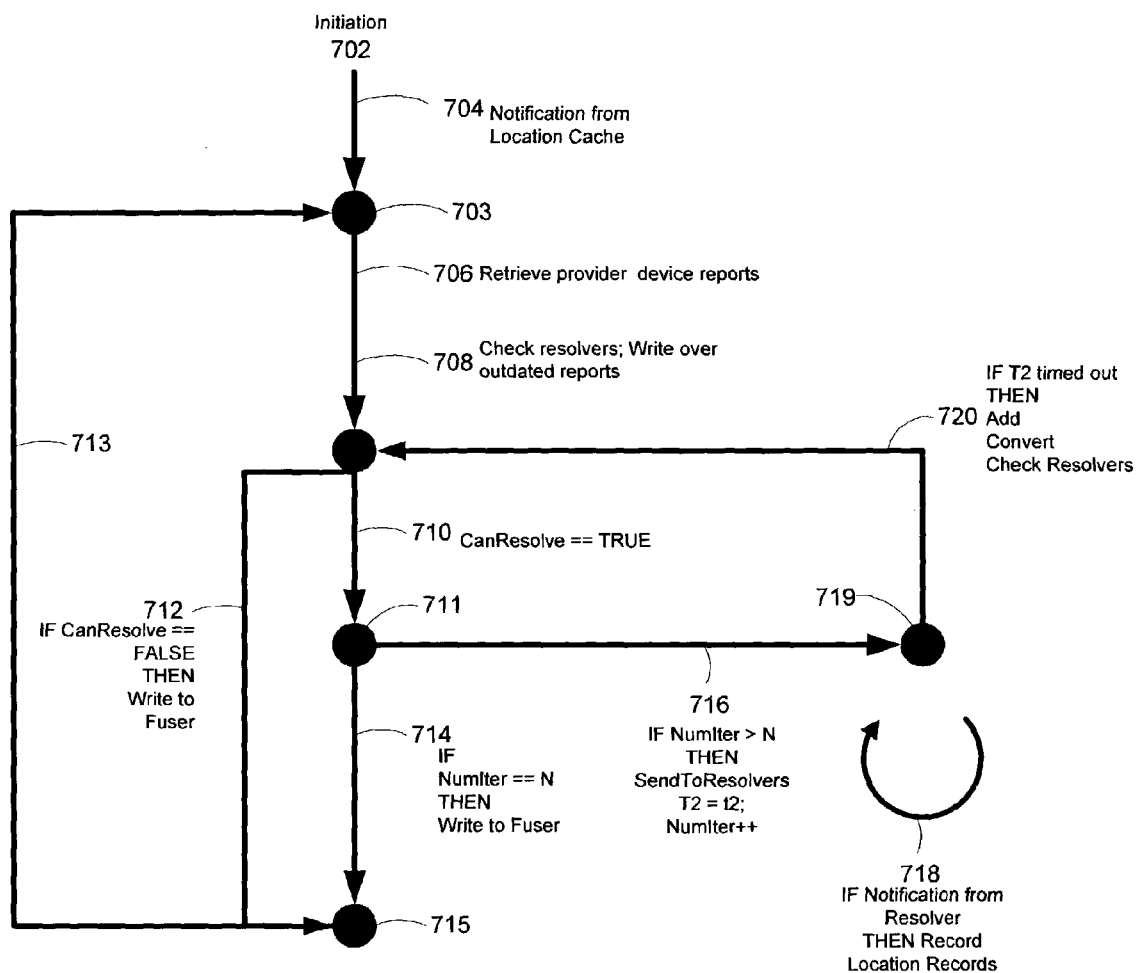
FIG. 7 is a state diagram for a master resolver according to an embodiment of the present invention.

Referring now to FIGS. 6 and 7 in combination with FIG. 4, master resolver 336 is described in further detail. Master resolver 336 manages the process of distributing data from providers 402 to resolvers 408 and from resolvers 408 to fuser engine 340. Within master resolver 336, a plurality of data structures are maintained, including a current list of location reports from each device and each provider and each resolver 408. Master resolver 336 further keeps track of the location report being resolved by a resolver 402, a current cycle of location reports, and a cycle of reports that are ready to be sent to fuser engine 340.

In one embodiment, master resolver 336 maintains at least four parameters that are configurable by a user, including a timeout for all iterations to a resolver 408, a timeout for information of one resolver iteration, and a number of resolver iterations, shown as NumIter in FIG. 7. As will be appreciated by one of skill in the art with the benefit of this disclosure, the number of parameters maintained and the timing therefore can be altered for design choices and be within the scope of this embodiment.

As shown in FIG. 6, master resolver 336 is initialized, block 602, and waits until master resolver 336 receives a notification from plugin manager 412 in block 604. After being notified, master resolver 336 then retrieves a set of location reports that were saved by plugin manager 412 and saves them, block 605. Next, master resolver 336 checks each resolver to find out if a resolver is available to resolve a report, as shown in decision block 606. If a resolver is available to resolve a new location report, master resolver 336 then checks to see if that resolver is configured for one of the types of location reports in the saved set of location reports, i.e. capable of resolving a report as shown in block 607. If any reports are capable of being resolved by a resolver, master resolver 336 determines whether or not a maximum number of iterations has been reached, as shown in block 608. If the maximum number of iterations has not been reached, the master resolver 336 forwards the report to user agent 332 in block 609. User agent 332 interacts with WinFS and cache 334 to add data to the report. By using cached data, the reports are protected by avoiding sending more data than necessary to resolvers. If the user agent 332 and cache 334 are incapable of adding necessary data, master resolver 336 forwards the data to the appropriate resolver and starts an associated timer and increments a number of iterations as shown in block 610.

If no resolvers are available, or if a maximum number of iterations has been reached, the reports are determined to be ready to fuse, block 611. In one embodiment, master resolver 336 can transmit location reports, depending on the resolver interpreting the data.

Prior to the elapsing of the timer, when a resolver 408 notifies master resolver 336 that resolving for a particular location report has been completed, master resolver 336 overwrites any previous set of location reports generated by that particular resolver in block 612.

Block 613 provides that, upon the timer elapsing, master resolver 336 adds any latest location report(s) to a set of location reports that are ready to be sent to fuser engine 340. Further, master resolver 336 resets any resolvers associated with that timer so that all old location reports with the resolvers are ignored, and the set of location reports are sent to fuser engine 340. Master resolver 336 further checks each of the free resolvers for availability to resolve any new location reports.

Fuser engine 340 operates on the data, and block 614 provides that the master resolver 336 receives updates from fuser engine 340 in the form of a latest location object (LatLoc). After receiving the LatLoc, block 616 provides for fuser engine 340 to transfer LatLoc to WinFS, which can then trigger notification service 460 that a new location object requires attention.

In one embodiment, master resolver 336 keeps a counter that denotes a cycle of a current set of location reports that are ready to be sent to fuser engine 340 to resolve conflicts, a latest set of location reports ready to be resolved, a latest location extension object for transmittal to fuser engine 340 and any current location report that may be being resolved by a resolver 408. In one embodiment, the determination as to which location reports should be transmitted from master resolver 336 to fuser engine 340 is determined according to the counter. In this embodiment, the counter assists by avoiding having stale data sent to master resolver 336. The stale data can be tagged as allocable to an older cycle.

An embodiment provides that a snapshot representing a master resolver 336 interpretation of the computer's location is available at any time. The snapshot represents data that is ready to be transmitted to fuser engine 340 at the given time. Each location report identifies a set of location reports that the associated provider 402 generates. Location reports can also be generated indirectly from other location reports, in which case, a pointer can be configured to link the location reports together.

TABLE 1

| Key | Value | |
|---|---|---|
| Resolver1 | Resolving: | LReport2 |
|  | Latest: | Lreport1 |
| Resolver2 | Resolving: | LReport2 |
|  | Latest: | LReport2 |
| Resolver3 | Resolving: | LReport1 |
|  | Latest: | LReport3 |

Referring to Table 1, above, an exemplary data structure associated with master resolver 336 illustrates resolvers 408 and their corresponding values. As shown, the latest location report is maintained being operated on by each resolver 408. In another embodiment, the location reports are in a hierarchical data structure.

TABLE 2

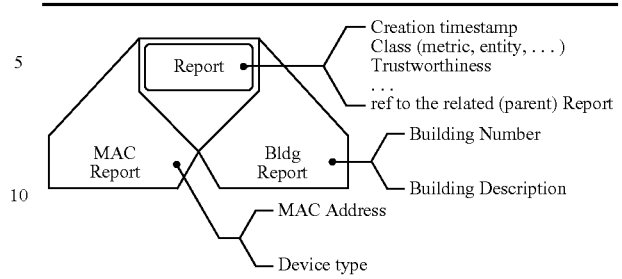

FIG. 7 illustrates a state diagram according to one embodiment of master resolver 336. The state diagram shows initiation of master resolver 702. Master resolver 336 waits for a notification from cache 334 as shown by line 704. Upon receiving a notification, at node 703, master resolver 336 retrieves location reports 706. Master resolver checks plugin manager 412 for data. When ready, master resolver 336 retrieves the data and checks cache 334 for any matching data. If no matching data, master resolver 336 checks resolvers and writes over any outdated reports 708.

Node 709 indicates initiation of the determination of whether a resolver 408 can or can't resolve a location report. If any resolver can resolve a report 710, the state diagram proceeds to node 711. If no resolver, cache 334 or user agent 332 can resolve a report, then the master resolver 336 writes to fuser engine 340 via line 712. Node 715 represents writing to fuser engine 340. After writing to fuser engine 340, the process repeats itself as shown by line 713. At node 711, if the number of iterations is less than a limit "n", the reports are sent to resolvers 408 with a timer started and a counter incremented as shown by line 716. At node 719, notifications from resolvers 408 are received and location records are recorded as shown by line 718.

Resolvers

As discussed above, resolvers 408 retrieve location information from master resolver 336. Resolvers 408 can be configured to include rich information in the location reports and send the upgraded location reports back to master resolver 336. Resolvers are expected to apprise location service 210 regarding the types of location data the resolvers are capable of resolving upon installation. A resolver 408 is configured to understand a certain type of data. If a resolver 408 is able to find information relating to that type of data, the resolver passes the data to master resolver 336 as one or more location reports.

In one embodiment, resolvers 408 communicate with one or more of a source or sources to translate information. Resolvers 408 also communicate with a cache of data from the sources. In one embodiment, resolvers 408 follow a policy that determines whether resolvers 408 can or should contact sources for data. Resolvers 408 further are capable of providing data structures addressable by location service 210, such as a list of location reports that are translatable, which can be resolver specific. Another data structure within a resolver includes an identification of the report currently being translated and any translated objects.

An appropriate data structure for listing location reports can be implemented as:

List[LReport] can_translate;

In operation, resolvers 408 wait for a notification from master resolver 336. Upon notification, a location report is retrieved for resolving. The resolving creates location reports that are returned to master resolver 336.

Plugin Manager

Figure 8A:
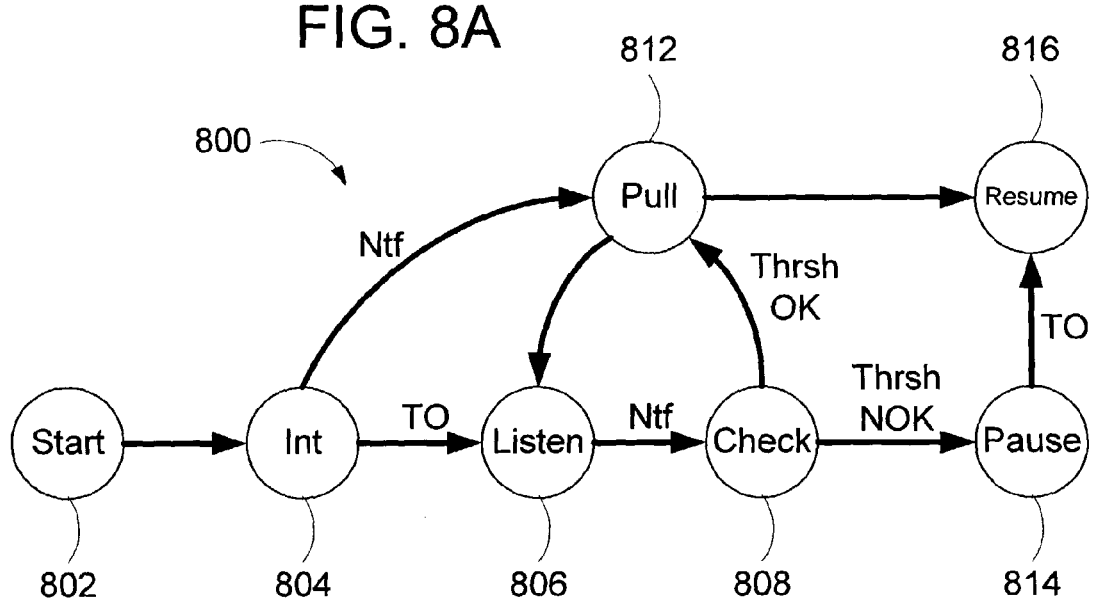
FIG. 8A is a flow diagram for a plugin manager according to an embodiment of the present invention.
Figure 8B:
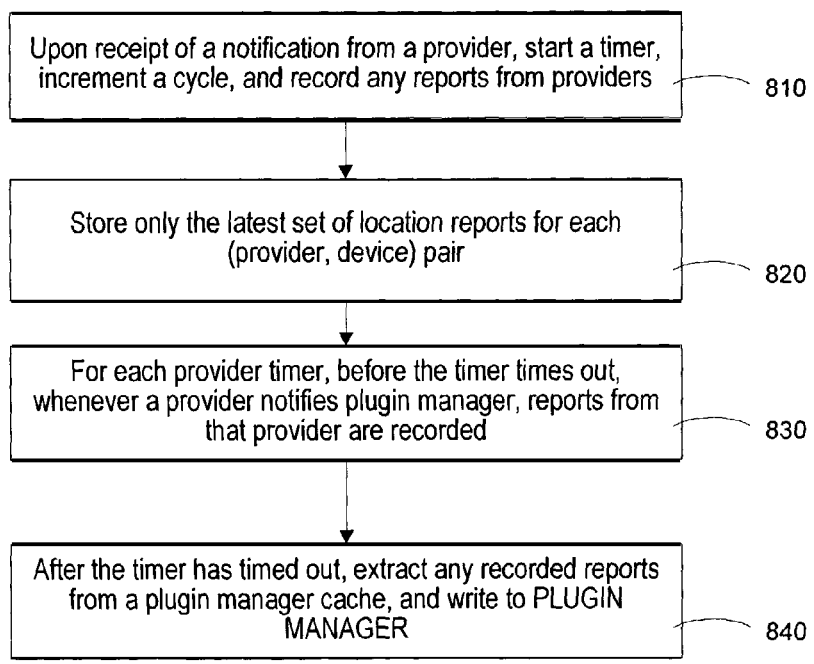
FIG. 8B is a state transition diagram for a plugin manager interacting with a provider according to an embodiment of the present invention.

Referring now to FIGS. 8A and 8B, diagrams illustrate the functions of plugin manager 412. In general, plugin manager 412 is responsible for interactions and data exchanges between location service 210 and any registered plugin. More specifically, in an embodiment, plugin manager 412 implements two major functions, including providing central management for interactions with plugins and providing a central listening function for intercepting update notifications originating from providers. As a central manager, plugin manager 412 is the central component receiving user administrative requests from a management API (LocMgmtAPI). Plugin manager 412 translates the requests into actions carried over via location plugin APIs, which can be for providers, resolvers or both. Plugin manager 412's administrative control role is to interface location service 210 with resolvers and providers. In an embodiment, plugin manager 412 maintains a set of objects representing provider and resolver plugins that stand for all the plugins registered at that moment. As the manager of the set, plugin manager 412 is responsible for providing a list of the plugins registered with location service 210; and for registering or unregistering plugins either at service startup time or dynamically, upon user/app request. For example, the registration/unregistration can be via management APIs, which could be implemented as LocMgmtRegisterPlg/-LocMgmtUnregisterPlg; and arbitrating an application's read-only/read-write access to a plugin's configuration; and interfacing query and set calls, LocMgmtQuery/SetPlg, and configuration data from and to plugins.

In one embodiment, plugin manager 412 is a listening component implemented as the central component listening for device update notifications originating from location provider plugins.

The internal representation of a registered plugin is described in a generic way via an object having the structure shown below in Table 3:

The data structures provided in Table 3 include six data structures. One is m_ePlgType, which provides an enumeration type identifying the type of the plugin, either a Location Provider plugin (ePlgProvider) or a location resolver plugin (ePlgResolver). A second data structure is m_wszGuid, which identifies uniquely the plugin with a globally unique identifier (GUID). The GUID can be stored in the field wszPlgGuid in the format L"a Q1A11' {xxxxxxxx-xxxx-xxxx-xxxx-xxxxxxxxxxxx}" and can be hard coded by the plugin itself. Location service 210 retrieves the plugin's GUID at registration time.

A third data structure is m_wszBinary, which provides the name of the binary implementing the plugin. One binary can implement multiple plugins, therefore, the data structure generally does not uniquely identify a particular plugin.

A fourth data structure is m_hModule, which provides a handle to the data link library (DLL) implementing the plugin.

A fifth data structure is mhNtfEvent, which provides a notification event to be signaled by the location provider/resolver plugins whenever the location sensitive data for some device (a device report) has changed or whenever location reports have been inferred. Plugins can create the notification event when called into an initialization function and return the handle to this event back to the service. Subsequently, whenever a plugin has an updated device report/location report it only needs to signal this event to notify location service 210 about the update.

A sixth data structure is m_pfnLocPlg*, which provides pointers to the functions exported by a plugin. When a plugin context is created (either at registration time or at service startup time) location service 210 initializes them with pointers to predetermined functions such as those identified as location plugin APIs.

Plugins further have identifying classes, CProvPlugin and CResPlugin, that identify them as either a resolver plugin or a provider plugin. An exemplary definition provided below in Table 4 derived from CPlugin, with the definition as follows:

TABLE 3

```
class CPlugin : public CSync
{
    ...
protected:
    // plugin parameters imaged in the plugin implementation
    EPLG_TYPE    m_ePlgType;    // Plugin type;
    LPWSTR    m_wszGuid;    // Plugin GUID
    LPWSTR    m_wszBinary;    // Binary implementing the plugin
    // plugin parameters used for internal management
    HANDLE    m_hModule;    // Handle to the module implementing the plugin
    HANDLE    m_hRegNotif;    // Handle for the notification registration
    HANDLE    m_hNtfEvent;    // notification event owned by the plugin
    LPVOID    m_lpContext;    // Plugin's specific context
    PFNLocPlgInit    m_pfnLocPlgInitialize;    // Plugin's initialization handler
    PFNLocPlgTerm    m_pfnLocPlgTerminate;    // Plugin's termination handler
    PFNLocPlgQueryConfig    m_pfnLocPlgQueryConfig;    // "Query configuration"
handler
    PFNLocPlgSetConfig    m_pfnLocPlgSetConfig;    // "Set configuration" handler
    ...
};
```

TABLE 4

```
class CProvPlugin : public CPlugin
{
    ...
private: // private data members
    // plugin parameters used for timing management
    time_t m_tmNtfThreshold;         // Notification threshold interval
    ...
    PFNLocProvRefreshReports    m_pfnLocProvRefreshReports;    // "Refresh reports"
handler
    PFNLocProvReadReports       m_pfnLocProvReadReports;       // "Read reports"
handler
    ...
};
and
class CResPlugin : public CPlugin
{
private:
    PFNLocResResolveReports     m_pfnLocResResolveReports;     // "Resolve Reports"
handler
    PFNLocResReadReports        m_pfnLocResReadReports;        // "Read reports"
handler
    ...
};
```

Manager 412 is internally represented in location service 210 as an object, such as described below in Table 5:

TABLE 5

```
class CPluginMgr: public CSync
{
private:
    ...
    // map for provider plugins
    G2P_Map m_mapProv;
    // map for resolver plugins
    G2P_Map m_mapRes;
    ...
public: //public data members
    HANDLE m_hNtfEvent;
public:
    ...
    // Initialize the PluginMgr object
    DWORD Initialize( );
    // Clean out resources used by the PluginMgr object
    DWORD Terminate( );
    // Load a plugin provided by its GUID and the binary that implements it
    DWORD LoadPlugin(LPWSTR wszGuid, LPWSTR wszBinary, PEPLG_TYPE
pPlgType=NULL);
    // Unregister the plugin provided by its GUID
    DWORD UnloadPlugin(LPWSTR wszGuid);
    // Return the table enumerating all the plugins registered with the service
    DWORD EnumeratePlugins(PLM_PLG_TABLE pPlgTable);
    // Open a user handle for a particular plugin
    DWORD OpenPlugin(LPWSTR wszGuid, DWORD dwFlags, HANDLE *phPlg);
    // Close a user handle for a particular plugin
    DWORD ClosePlugin(HANDLE phPlg);
    // Pulls the location reports accumulated in the providers
    DWORD PullProvReports(CReportSet & reportSet);
    // Push the location reports to the resolvers
    DWORD PushResReports(HANDLE hCycle, CReportSet & reportSet, BOOL & bWait);
    ...
public: // management calls into the Plugin Manager
    // Query the PluginMgr configuration
    DWORD QueryConfig(DWORD dwInFlags, PLM_PLGMGR pPlgMgrCfg, LPDWORD
pdwOutFlags);
    // Set call into the PluginMgr configuration
    DWORD SetConfig(DWORD dwInFlags, PLM_PLGMGR pPlgMgrCfg, LPDWORD
pdwOutFlags);
public: // overridables
    DWORD OnPluginNotify(CProvPlugin *pProvPlugin);
};
```

The members of plugin manager 412 include seven types of data structures. A first type is m_mapProv and m_mapRes, which are sets of all the registered Provider and Resolver Plugins. The sets contain references to CPlugin objects, each representing internally the characteristics and interface with the respective Plugin.

A second type of data structure is m_hNtfEvent, which provides a notification event for plugin manager 412. Each time plugin manager 412 has updated Reports from Provider Plugins, the data structure sets this event. Master resolver 406 is registered with this event, such that it senses plugin manager 412 notifications and pulls the updates when ready.

A third type of data structure is Initialize and Terminate, which provides plugin manager 412 initialization and termination handlers.

A fourth type of data structure includes LoadPlugin, UnloadPlugin, OpenPlugin, and ClosePlugin, which provide administrative control handlers over the set of registered plugins.

A fifth type of data structure includes PullProvReports, which provides a handler called in by master resolver 416 whenever it needs to pick up updated reports from plugin manager 412.

A sixth type of data structure includes PushResReports, which provides a handler called in by master resolver 406 whenever it needs to dispatch one or more reports to resolver plugins.

A seventh type of data structure includes QueryConfig and SetConfig, whicha provide management handlers for plugin manager 412.

In its notification listener role, plugin manager 412 monitors the update signals generated by the plugins. A notification is treated differently depending on the type of plugin associated with the notification.

In an embodiment, notifications originating in provider plugins, which arrive in an unsolicited way, are treated by plugin manager 412 with special care in imposing a frequency threshold when accepting and/or processing. The threshold value itself can be a user configurable value via management calls such as LocMgmtQuery/SetPlg.

Notifications originating from resolver plugins are generated in response to location reports passed down to resolvers by location service 210, so there is no threshold limit required.

The logic used by plugin manager 412 to sense provider notifications and for retrieving updated reports is shown in FIG. 8A as a finite state machine operating on each of the provider plugin objects to check the frequency threshold value.

The operations begin at start 802 when a notification is sensed. Node 804 identifies initialization 804, an initial state handler. The handler marks a provider as "uninitialized," sets a provider timer to a predetermined provider threshold Provider.last_ntf_time<–0; and registers with the provider for update notifications. Notifications are directed to pull 812.

After a time out, state machine 800 continues to node 806, which identifies a listen state handler. The listen state handler 806 sets the provider time to the predetermined provider threshold and sets providers that are uninitialized as initialized. Listen state handler 806 then sets a notification event, Set PlgMgr Notification event (signal PlgMgr). If an update notification is generated by a provider, state machine 800 proceeds to node 808, which identifies a check state handler. Check state handler 808 resets the provider timer and determines whether the last notification time is greater than or equal to the predetermined provider threshold (TimeNow—Provider.last_ntf_time>=Provider.threshold). If so, the notification frequency threshold was checked and passed, meaning that provider notifications were spanned in time to an interval larger than the provider's threshold. If the notifications were spanned in time, state machine 800 directs the notifications to pull 812. If not, the notification frequency threshold was checked and failed, meaning that notifications are closer in time than the provider's configured threshold.

For failures, state machine 800 provides for a pause 814, which is a state handler that deregisters the provider from provider notifications, and sets a provider timer to a provider threshold equal to the last notification time (TimeNow—Provider.last_ntf_time). After a timeout, state machine 800 passes to resume 816 to resume registration of provider notifications. Then, state machine 800 passes to pull 812.

As discussed, resume 816, check 808 and initialization 804 each are directed to pull 812, which identifies a pull state handler. The pull state handler pulls updated reports from the provider according to the time of the last notification: Provider.last_ntf_time<–TimeNow. Also, if a provider is uninitialized, then the provider is marked as initialized, and if there are no other uninitialized providers then a plugin manager notification event is set.

The actions described with reference to state machine 800 shield location service 210 from an overloading notification rate in two special cases. Specifically, in a first case, at startup time, each provider is expected to generate an update notification as part of its initial data collection from the underlying device. If these notifications are processed unconditionally, this would cause location service 210 to spin as it is increasingly building the location context from each device data. A better option which this state machine implements is to wait at initialization time for all the registered providers to reach their initial state, and only then collect their data and signal to the other Location service 210 subsystems, such as master resolver that updates are available. As a consequential special case, based on the assumption that providers (like any other plugin) can't be trusted to do the right thing, it is a possibility a provider delays the initial notification for too long, causing an unacceptable delay of location service 210. To prevent an unacceptable delay, location service 210 imposes a timeout equal to the provider's threshold while waiting for the initial notification. Should this timeout be reached, the provider is considered initialized even in the absence of its data, and location service 210 is unblocked.

In a second special case, location service 210 is guarded against an excessive rate of notifications through the threshold value specific to each Provider. When plugin manager 412 processes a provider notification, it timestamps the notification in the provider context. Should the next notification be sensed in a time interval shorter than the allowed threshold, plugin manager 412 deregisters from the provider's notification event, and starts a timer for the remaining of the threshold period. Plugin manager 412 pulls the most current reports from the provider and re-registers for notifications only after the timer times out. Until then, location service 210 is isolated and protected from the misbehaving provider.

Notwithstanding state machine 800 logic, any administrative operation is permitted on the provider, up to, and including plugin unload/deregistration.

In one embodiment, plugin manager 412 is implemented to maintain a last cycle of provider reports received. The latest provider reports include those from each provider 402 associated with a device. Plugin manager 412 is responsible for transmitting the latest provider reports to master resolver 406. In the embodiment, plugin manager 412, as discussed above relative to FIG. 8A, has at least one configurable parameter related to a time out for receiving reports from providers.

Location service 210 benefits from having the timeout in that fast or bad providers are thereby prevented from overwhelming the location service with too many reports, as discussed above. Table 6, below, illustrates an exemplary data structure organization for storing the latest set of provider reports so that each set of reports is indexed by the provider and device:

TABLE 6

| Key | Value |
| --- | --- |
| (Provider1, Device1) | SetPReport1 |
| (Provider1, Device2) | SetPReport2 |
| (Provider2, Device2) | SetPReport3 |

Referring to FIG. 8B, block 810 provides that, upon receipt of a notification from a provider 402, plugin manager 412 start a timer, increments a cycle, and records any reports from providers 402. Block 820 provides that plugin manager 412 stores only the latest set of location reports for each (provider, device) pair. For example, referring to Table 1, redundancies are avoided by taking only the most recent data from a given pair and discarding older data. Block 830 provides that, before the timer times out, whenever a provider notifies plugin manager 412, reports from that provider 402 are recorded. Block 840 provides that after the timer has timed out, plugin manager 412 extracts any recorded reports from a plugin manager cache, and writes it to data structure "PLUGIN MANAGER."

Figure 9:
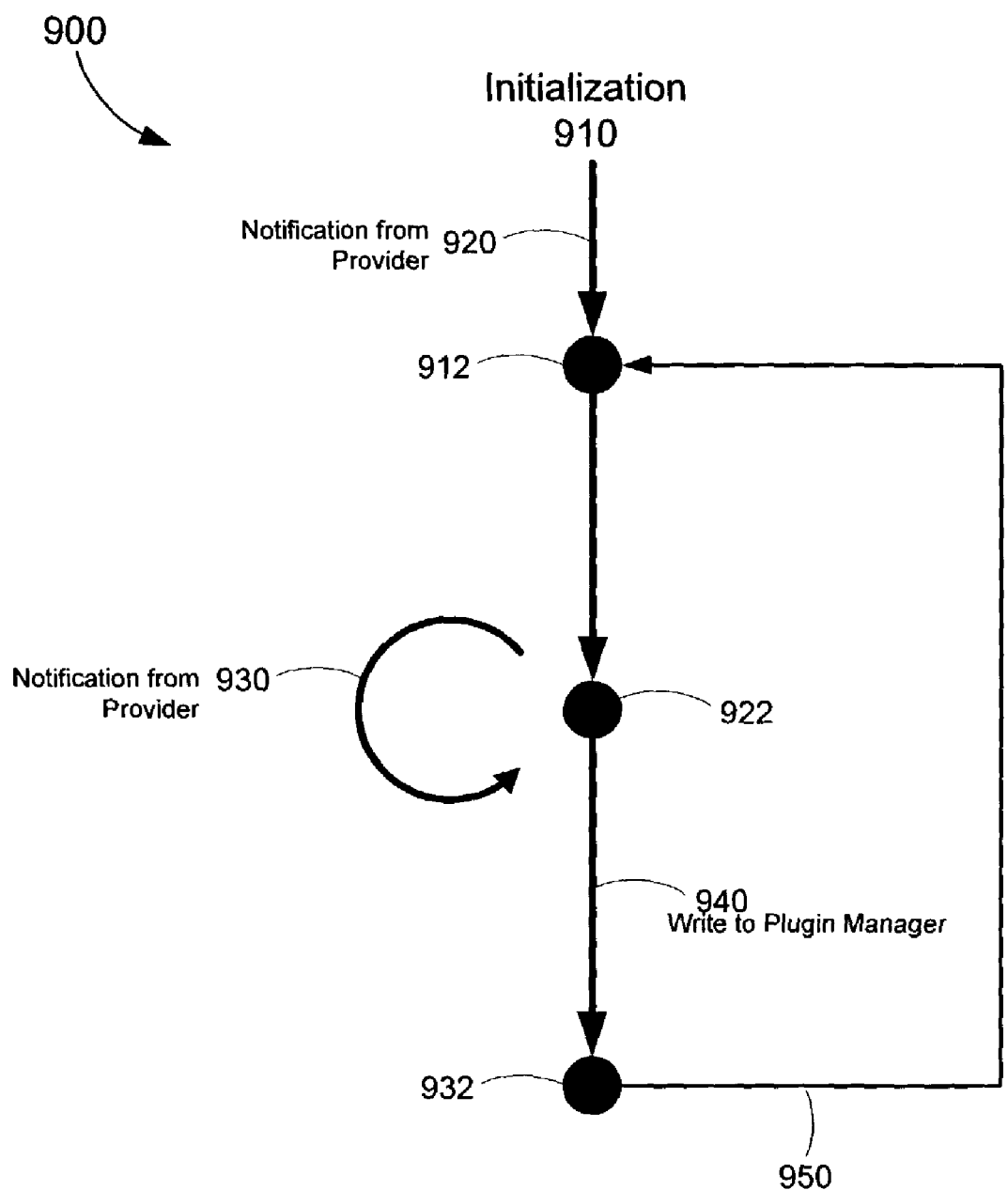
FIG. 9 is a state diagram for a plugin manager according to an embodiment of the present invention.

Referring now to FIG. 9, a state transition diagram appropriate for each provider operated on by plugin manager 412 is shown. The state diagram 900 begins with an initialization 910. If a notification from a provider is received as shown by line 920, plugin manager, at node 912, initiates code within plugin manager 412 to record a location report and begin the timer. Line 930 identifies a repeating loop of notifications of location reports and recording of the reports at node 922. Line 940 identifies that when the timer times out, the data is written to PLUGIN MANAGER at node 932. If the timer does not time out, line 950 identifies that the process loops back to node 912. In an embodiment, the code for recording the location report provides for creating a new set of location reports for each device for which plugin manager 412 maintains reports. Additionally, the code can be configured to group all sets of location reports, stamp the reports with an identifier related to a cycle and flag the reports as being ready for transmittal outside of plugin manager 412.

Fuser

Figure 10:
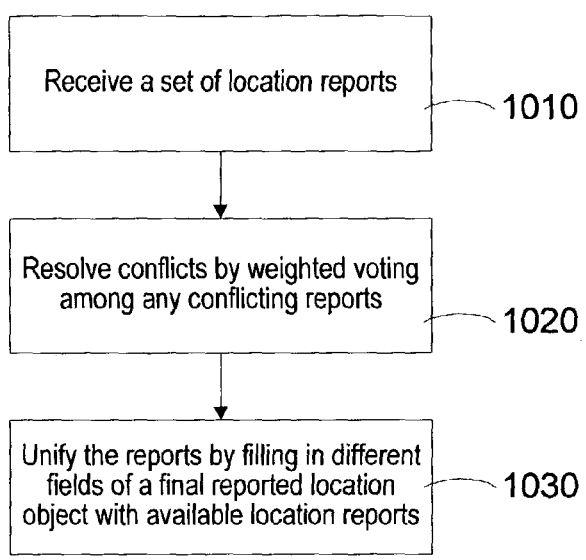
FIG. 10 is a flow diagram illustrating a method according to an embodiment of the present invention.

Referring now to FIG. 10, a block diagram illustrates the basic functions of fuser engine 340. Fuser engine 340 generates one consistent location object representing its best guess of the computer's location based on the location reports and location reports read from cache 334. Fuser engine 340 does this through a process referred to herein as fusion. Fusion involves conflict resolution, unification and reconciliation of conflicting reports.

Referring to FIG. 10, block 1010 provides that fuser engine 340 receives a set of location reports and a set of location reports associated with the set of location reports. The reports can be sent individually from several providers and resolvers, or the reports can be received as a group, such as from master resolver 336. Some reports may conflict with each other. For example, location reports might give different room numbers for the computer's location. Block 1020 provides that fuser engine 340 resolves these conflicts by applying one or more statistical processes, such as a weighted voting process among the conflicting reports. The weights come from a predetermined set of sources and could include a provider weight, resolver weight, resolver split rate, spatial uncertainty, and age of the report.

Block 1030 provides that fuser engine 340 unify the reports by filling in different fields of the final reported location object with available location reports. For instance, reports giving the room number contribute to the room field, and reports giving the building number contribute to the building field.

In one embodiment, location reports and location reports are received by fuser 340 as a tree of resolver reports that fuser engine 340 turns into a single location report or location object for use by applications and the like outside of location service 210. The single location report can be assembled into a predetermined format, such as a Microsoft Location Report format defined by MapPoint® or another appropriate application.

In one embodiment, location service 210 passes two types of reports to fuser engine 340. One can include a metric report including a latitude, longitude and an altitude. A metric report could also include an x component and a y component, as in enabling a Y axis and an X axis location. Another type of report location service 210 can pass to fuser engine 340 includes a hierarchical report indicating, for example, (building floor, room); (street address, city, state, country); or (universe, galaxy, solar system, planet) and the like. The elements of a hierarchical report can also be represented as separate location reports with links that allow a hierarchical report to be created or assembled in fuser engine 340. The types of reports passed to fuser engine 340 are received by an appropriate funnel. A funnel identifies the type of information to be passed to fuser 340 such that fuser 340 will be enabled to fuse the information.

In one embodiment, prior to sending reports to fuser engine 340, another component of location service 210 tags each element in each report, or the report itself, with weights to enable fusing. The weights, such as the provider weight, resolver split weight, spatial uncertainty, resolver weight, and age of the report can be represented as integers or as real numbers between zero and 1.

Regarding the weights, a provider weight, in one embodiment, represents a provider trustworthiness. More specifically, a provider trustworthiness can be a probability determined by location service 210 that the given provider associated with a report is providing correct data. In one embodiment, the provider trustworthiness is determined by a user via a user interface allowing the user to down-weight providers that are untrustworthy. For example, a cell phone provider with location data that is known to be inaccurate can be down-weighted by a user.

A resolver weight can be a resolver trustworthiness, determined by location service 210, that the given resolver associated with a report is providing correct data. In the case of multiple resolvers associated with a report, one probability parameter can take into account multiple resolver trustworthiness parameters.

A spatial certainty weight can be a weight associated with the precision of a given report. For example, if a report provides a room number or location based on an 802.11 type access point, and the access point covers approximately 100 rooms, the spatial certainty parameter of the report is 1/100.

An age weight can be an age trustworthiness that is a function of time. Reports can be given less weight as the reports age. As a report ages, the age weight decreases. In one embodiment, the age weight is determined by applying a negative exponential function of time, which can include a minimum weight and a timeout after which the report has no weighting., A resolve split weight may also be applied to reports to account for the splitting of a single provider report through multiple resolvers. For instance, an 802.11 provider may have its report sent to two different resolvers, each giving a (latitude, longitude). The resolver split weight in this case would be 0.5, reflecting the fact that one provider report was split into two resolvers. This prevents a single provider report from gaining overwhelming weight by splitting into more than one resolver.

In one embodiment, for certain types of reports, such as a metric type of report, the weights are combined into a single weight by applying multiplying the weights.

As shown in equation 1, a set of metric reports can be represented by applying a weighted average. More specifically, equation 1 demonstrates that if four weights are on report i: $w_{1i}$, $w_{2i}$, $w_{3i}$, and $W_{4i}$, then the fuser combines them into one weight by multiplying: $w_i = w_{1i} w_{2i} w_{3i} w_{4i}$. For a set of metric reports such as $(x_i, y_i)$, i=1K N, the fused report could be the weighted average:

$$(x, y) = \left( \sum_{i=1}^{N} w_i x_i, \sum_{i=1}^{N} w_i y_i \right) \Big/ \sum_{i=1}^{N} w_i \quad \text{Equation 1}$$

For hierarchical types of reports, rather than a weighted average, fuser engine 340 applies a weighted hierarchical voting process. For example, referring to table 3, below, an example of four hierarchical reports is provided. Each reported provides a building, room and floor element. A weight is associated with each element of each report. Fuser engine 340 assembles the elements from a tree of reports. In one embodiment the tree of reports is created in master resolver 336.

TABLE 7

| | \multicolumn{4}{c}{Report} | |
|---|---|---|---|---|---|
| | 1 | 2 | 3 | 4 | LOCATION |
| Building | 40 (0.9) | 40 (0.8) | 41 (0.3) | 40 (0.9) | 40 |
| Floor | 3 (0.5) | 4 (0.4) | 1 (0.7) | 3 (0.3) | 3 |
| Room | 3141 (0.3) | 4212 (0.1) | 1021 (0.2) | 3142 (0.2) | 3141 |

Referring to Table 7, four reports are considered, labeled 1-4. The weighted hierarchical voting initiates with a physically largest level of the hierarchy. In Table 3, the largest element is the building. The weights for each candidate are summed. For example, in Table 3, building 40 has a combined weight of 0.9+0.8+0.9=2.6, which is a higher combined weight than the combined weight associated with building 41 of 0.3.

In an embodiment, after a largest level of hierarchy element is eliminated from consideration, any sub-levels to that largest level are automatically eliminated as well. Thus, for example, after building 41 is eliminated, sub-levels to building 41 are eliminated. Thus, any floors within building 41 are eliminated from location consideration. Of the remaining floors, the remaining weighted averages indicate that floor 3 has the highest probability of being correct. After floor 3 is identified, floors 4 and 1 and any rooms on floors 4 and 1 are eliminated. Between the remaining rooms, room 3141 has the higher weight. Accordingly, the location identified by fuser engine 340 is building 40, floor 3 and room 3141.

Fuser engine 340 can create a table such as Table 3 for each type of hierarchy determined by location service 210. A hierarchy can have one or more levels. In one-level hierarchical types, fuser engine 340 applies a voting to determine most probable location after just one level.

Notifications Service

Notifications application(s) operate in conjunction with a WinFS notifications platform. A notification application defines the types of notifications an application can subscribe for, when and how an application is to be notified. Notifications application contains subscription schemas, notification schemas, event source, event schema, notification generation rules, and notification formatting.

The subscription schema defines events that can occur for which an application such as Outlook might want to register. For example, a subscription schema for location services would allow Outlook to register to be notified when the current location is "home". The notification schema defines what information reaches Outlook when it gets notified. For example, the notification schema might allow Outlook to receive the time, date, and the current location. The event source determines the source of the events. An event is something that occurs that may be of interest to the application registering for notifications. For example, fuser 340 writing the new location into WinFS is an event. The event source is WinFS.

The event schema defines what information is needed for an event. For example, a time, date, and location is needed for the event. The notification generation rules match the events with the subscription schemas to see if an application needs to be notified. For example, suppose the current location was "home", and an application has registered to be notified when the location was "home", then it is the notification generate rule that checks for this match and produces a notification. The notification format just defines the way the notification will look to an application, which is useful to abstract the application from the SQL language.

Notification service 460 can keep a map of application identifiers associated with a list of locations. The mapping enables an application registered with notification service 460 to receive a notification when the location object identifies a location matching an application identifier.

Figure 11:
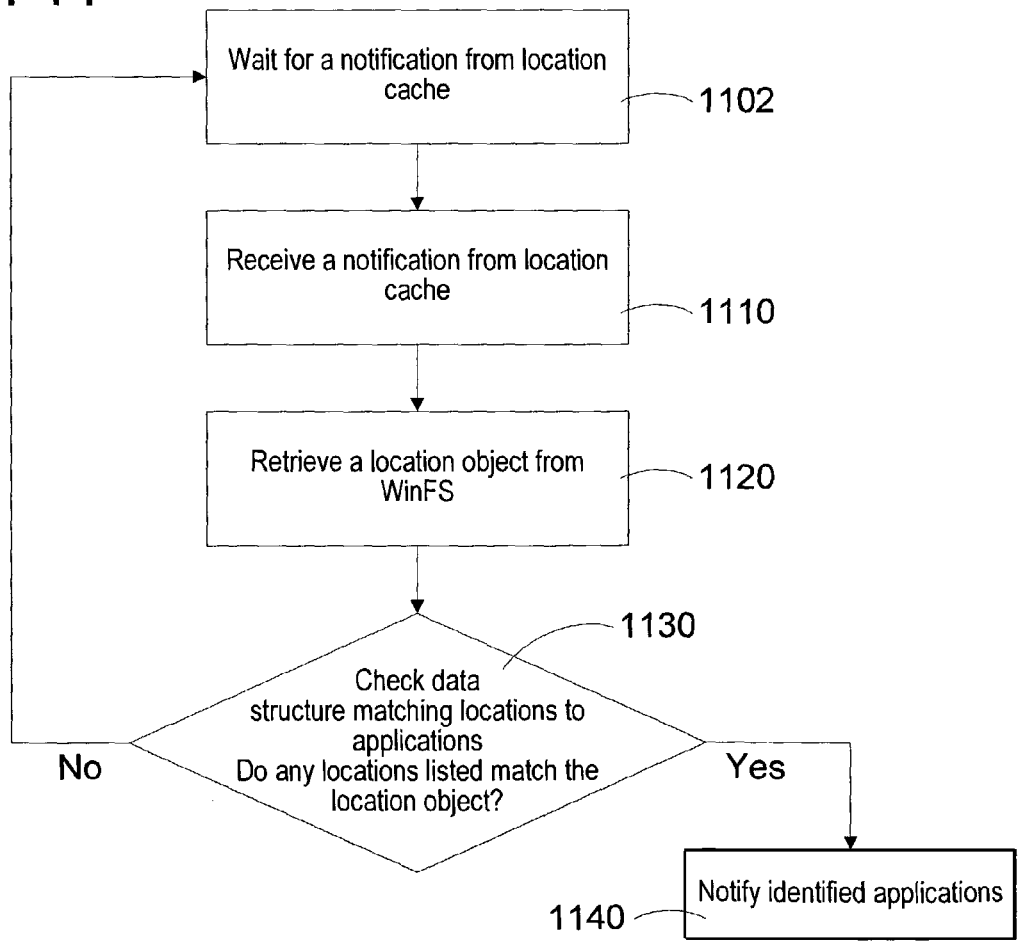
FIG. 11 is a flow diagram illustrating a method according to an embodiment of the present invention.

One example of a data structure appropriate for the notification dispatcher can include:

Map[Application, List[Location]] registered;

Referring now to FIG. 11, a flow diagram illustrates a method for notification service 460. Block 1102 provides that notification service wait for a notification from cache 334. In other embodiments, the notification can come from other components of location service 210, such as fuser engine 340, or the like. Block 1110 provides that notification service 460 receives a notification from cache 334. Block 1120 provides that notification service 460 retrieves the location object from WinFS Decision block 1130 provides that notification service 460 then checks the data structure matching locations to applications. If any locations are listed that match the location object, the identified applications are notified in block 1140. If no applications are identified, notification service 460 enters a wait state until another notification from cache 334 is received in block 1150.

Provider

Providers retrieve device specific location information from sensors, normalize the information, translate the information into a standard form, and send the information to plugin manager 412. Providers 402 appropriate for use with location service 210 have a timer T and a last report obtained from each device it is responsible for. The timer T can be set to a time that acts as a throttle to prevent devices from overwhelming the provider plugin and location service 210.

In one embodiment, sensors and/or providers publish a version number indicating a version of the location service 210 with which the providers/sensors work, and also a version number. For example, a GUID can identify a sensor/provider uniquely. In one embodiment, a provider can be implemented in an assembly with a strong name so that the provider can securely be identified by location service 210.

Figure 12:
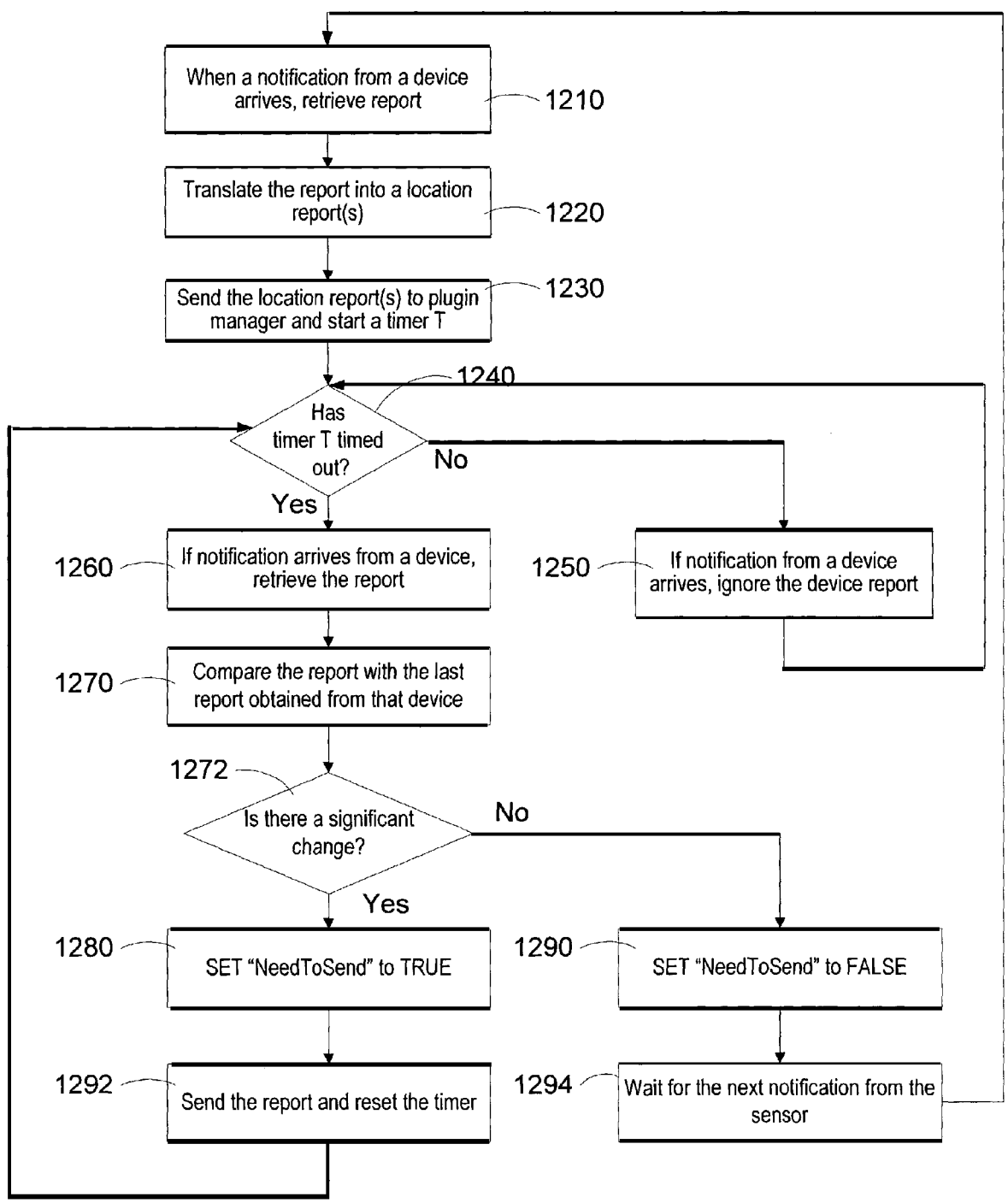
FIG. 12 is a flow diagram illustrating a method for an exemplary provider according to an embodiment of the present invention.

Providers 402 further keep a last report obtained from each device to check if a significant change in a perceived location has occurred. If so, the provider notifies a plugin manager 412. An exemplary data structure for maintaining the data within a provider, is shown below:

Map[Device, Device Report] LastReport;

Referring now to FIG. 12, the process performed by a provider 402 is described in further detail. More specifically, block 1210 provides that, when a notification from a sensor arrives for the first time, a provider retrieves the report. The provider saves the report into an appropriate data structure. Block 1220 provides that provider then translates the report into a location report(s). Block 1230 provides that provider then sends the location report(s) off to plugin manager 412 and starts a timer T.

Decision block 1240 determines whether timer T has timed out. If not, and a notification from a sensor arrives, provider ignores the report, block 1250. If so, the timer has timed out, then when a notification arrives from a sensor, the provider retrieves the report 1260. Block 1270 provides that provider compares the report with the last report obtained from that sensor. Decision block 1272 provides for determining whether a significant change occurred. Block 1280 provides that if there is significant change then "NeedToSend" is set to TRUE, otherwise, in block 1290 "NeedToSend" is set to FALSE. If "NeedToSend" is TRUE, block 1292 provides for sending the report and resetting the timer. If "NeedToSend" is FALSE, block 1294 provides for waiting for the next notification from the sensor.

Data Structures

As will be apparent to one of skill in the art with the benefit of this disclosure, there is a plurality of data structures that location service 210 to take full advantage of location service 210. Many additional or combined data structures are within the scope of embodiments presented herein. Exemplary data formats and data structures can include Location Report (LReport); Collection of Location Reports (ColLReport); Location Object (Location); and Location Extension Object (LocationEX).

A location report can be a report generated by a provider plugin 310". Location report can represent one automonous piece of information, so if a provider has information about more than one sensor, the provider canl generate more than one location report. In one embodiment, location reports include a data structure with data concerning a confidence, a report identifier and report type. In one embodiment, location service 210 requires a provider to supply an internal location report inherited from the location report. The internal location report can include an identifier, an NDMediaType, FunnelType, and one or more fuser weights.

Corresponding to a location report, another data structure is a set of location reports. A collection of location reports is appropriate for resolvers 408 that generate one or more reports for each location report received. SetLReport is used to represent what resolvers produce. An exemplary data structure can be structured as follows:

typedef SetLReport=Set[LReport]

A data structure discussed above associated with different components of location service 210 is a location object. A location object, as discussed above, is generated by fuser engine 340 as part of the fusion process. Applications configured to comply with location service 210 are expected to use the location object, which is a collection of location reports, to determine the location of computer running the service. In one embodiment, the collection includes a position, an address, a hierarchical location and metadata.

In one embodiment, location reports include two types of reports, application location reports and internal location reports. Internal location reports inherit from location reports. The difference between internal location reports and application location reports is that internal location reports are configured for fuser utilization. The internal location reports can be produced by fuser 340, providers 402 and resolvers 408. The application location reports are configured for application use. As such, application location reports are independent of fuser required data such as fuser weights and funnel type. An application location object includes a collection of application location reports. In one embodiment, an extension object can be a collection of internal location reports; and a location object can be a well-defined collection of application location reports, as described above. A location extension object can contain any collection of internal location reports pertaining to a user's current location.

Referring back to FIG. 4, a plurality of APIs enable location service 210 to interact with applications, plugins and internal components within location service 210. One API discussed above is the Location Management API (LocMgmt) 420. Location Management API 420 allows applications to configure the plugins, such as resolver plugins 408, cache 334, master resolver 336 and fuser engine 340. LocMgmt 420 provides the functions below to configure plugins. In one embodiment, LocMgmt 420 follows a file handling model. Thus, in the embodiment, opening a plugin causes a handle to the plugin to be created. Only one readwrite handle can be opened on the plugin at any point in time, but multiple handles can be opened for reading at the same time. A plugin must be opened before reads and writes can be performed. Closing a plugin closes a handle to the plugin.

Register a plugin with the location service
    input parameters: Plugin GUID, Plugin Name
    Enumerate all the plugins there are
    output parameters: a list of all the plugins with their GUID, name and type
    Open a handle to a plugin for reading or writing configuration information
    input parameters: Plugin GUID, Read or Write
    output parameters: Handle to the plugin
    Read parameters from an open plugin
    input parameters: Handle to a plugin
    output parameters: Plugin parameters, Success OR Fail
    Write parameters to an open plugin
    input parameters: Handle to a plugin, plugin parameters
    output parameters: Success OR Fail
    Closes a handle to a plugin
    input parameters: Handle to a plugin
    Unregister a plugin from the service
    input parameters: Handle to a plugin Another function of LocMgmt API 420 is to provide the functions below to configure cache 334. As with the model used with plugins, the API can follow a file handling type model:

Open a handle to the location cache for reading or writing configuration information
    input parameters: Read or Write
    output parameters: Handle to the cache
    Read parameters from the cache
    input parameters: Handle to a cache
    output parameters: Cache parameters, Success OR Fail Write parameters to the cache
  input parameters: Handle to a cache, cache parameters
  output parameters: Success OR Fail
Closes a handle to the cache
  input parameters: Handle to the cache LocMgmt API 420 also provides the functions below to configure master resolver 336. The API can be configured to follow a file handling model:

Open a handle to the Master Resolver for reading or writing configuration information
  input parameters: Read or Write
  output parameters: Handle to the Master Resolver
Read parameters from the Master Resolver
  input parameters: Handle to a Master Resolver
  output parameters: Master Resolver parameters, Success OR Fail
Write parameters to the Master Resolver
  input parameters: Handle to a Master Resolver, Master Resolver parameters
  output parameters: Success OR Fail
Closes a handle to the Master Resolver
  input parameters: Handle to the Master Resolver
  User-Defined Parameters In one embodiment, location service 210 is disposed on a user computer, which can be a mobile device or a stationary device. If location service 210 is associated with a user, location service 210 can be configured to cache locations in which the user is interested. For example, a user can be connected to a network and have access to a database of location information such as the active directory. Also, a user can be a local database. In one embodiment, location service 210 uses default parameters and a user can opt to change the parameters of the service.

More particularly, if a user opts to change the parameters of location service 210, such as a trustworthiness for resolver plugins 408 or provider plugins 402. Alternatively, location service 210 can be constructed to utilize a learning algorithm, such as a feedback control system that uses statistical analysis to determine the accuracy of different providers 310 and resolvers 408 over time. Depending on the configuration of location service 210, an inherent bias on different plugins can be set or location service 210 can prioritize information from plugins based on precision, user preference, and response time.

In one embodiment, location service 210 can be configured to produce different information to different applications. For example, an application can be configured to receive only sensor specific information.

Security

Another embodiment is directed to security of a location aware service, such as location service 210. More specifically, location service 210 can include a configuration and associated programming to avoid or otherwise address security issues.

For purposes of background, spoofing herein refers to an act of fooling a receiver of data into believing that the sender of the data is not who it actually is. In an embodiment, a source from which a plugin itself was obtained can be spoofed and individual packets of data a plugin receives can be spoofed. Tampering herein refers to an act of changing the data received by the receiver. Data received by plugins can potentially be tampered by a "hacker" on either a wireless or wired connection. Repudiation herein refers to occasions in which a sender later denies that data was sent. Thus, a source can provide plugins with data that is later denied as associated with that source. Information disclosure herein refers to an act of disclosing information to unintended parties. Thus, a source can track a user's location based on queries made by the plugins. A source can forward a user's location information or queries made by their plugins to other sources. Locations saved by the user can be accessed by other users.

Denial of service herein refers to the prevention of legitimate entities from using a service such as location service 210. For example, applications can overwhelm location service 210 with requests for information. Applications 220 could overwhelm location service 210 with registrations to be notified for a location change; a user could save more than an appropriate amount of locations; plugins could overwhelm location service 210 with data; a hacker could copy data sent to a plugin and continually send the data to the plugin, thus overwhelming the plugin and the location service 210.

Elevation of privilege refers to herein as the execution of an attacker of a command with the privilege of another user. Buffer overflows cause data obtained by the plugins that are riddled with executable commands to be executed with the same privilege as the service. A new plugin can maliciously or accidentally write over old plugins.

Location service 210 is configured to protect access to a user's location information. Location information is considered personal information and embodiments protect the information from being disclosed to untrusted parties.

Embodiments herein address five points of penetration from an attacker, including sources of location information, lookup services, user input, application APIs, and interfaces to the plugins.

Regarding protecting sources of location information, a source of location information is an entity that provides the providers with location information. The sources could include, for example, GPS, 802.11, GPRS, and NLA.

Location service 210 is extensible to pull in many sources of location information and to allow the user to adjust the confidence of the sources.

Further, location service 210 can be a protected service within a Windows® .Net platform, thereby providing stability.

The location service 210 allows a provider to encrypt its data to resolve security issues as well as delegating permission to application domains; for example, thereby allowing third party plugins to run in an application domain that has no network access. Such application domains can be created using Microsoft's .Net Common Language Runtime (CLR), which provides a shared type system, intermediate language and dynamic execution environment for implementing multiple source languages.

A lookup service is a service that a resolver uses to get more location information based on previous provider or resolver information. MapPoint, Active Directory and WinFS will be the two main lookups for location information.

The location service 210 has a generic web service resolver that supports any backend. More particularly, in one embodiment, location service 210 is configured to interact with Windows Privacy Platform (WPP). The WPP is a technology framework that enables developers to provide notice and choice over the user information with which an application, web page, or service is involved. WPP can be implemented as the core component of a distributed enforcement system across an operating system, providing informant mechanisms for system components like Watson®, service quality management (SQM), Fusion®, and the networking layer to verify user preferences before continuing with potentially privacy impacting operations. The core framework of policy/consent management is augmented by an additional component model for removing user history from various aspects of the operating system. Over this core programmatic layer, WPP provides a consistent set of user interface constructs for privacy notifications, obtaining user consent, and rendering privacy statements rendered in machine-readable privacy schemas. Thus, in an embodiment, WPP can be implemented to enable obtaining of privacy policies of backends and comparing with user preferences. Conflict causes a consent user interface to appear to warn the user. If there is a conflict, the consent user interface can be configured to pop up to warn the user. Thereafter, a user may choose to set an exception for the web service.

In one embodiment, location service 210 uses WPP to obtain privacy policies of resolvers and compare with user preferences. Conflict can cause a consent user interface to show up to warn the user. A user can choose to set an exception for a resolver. In one embodiment, the CLR framework is configured to securely identify the resolver.

The location service 210 has a centralized cache 332 controlled by location service 210 that protects the service from some security attacks. Further, location service 210 can be configured to deny resolvers obtaining the full context of a user's current location.

The location service 210 can be configured to record when location objects are changed and by whom; and when the Location user API 418 and Location notification API 416 and any other application used APIs are used and by whom; and when providers and resolvers supply location information. This protects the location service from some security attacks.

The location service 210 can be configured to work with WPP to obtain privacy policies of applications and compare those with user preferences. Any conflict can cause a consent user interface to warn a user. Thereafter, a user can choose to set an exception. CLR can be used to securely identify the application. In an embodiment, only administrators of machines are allowed to register or unregister applications with location service 210. Further, location service 210 can be configured to facilitate diagnosis of which applications use location information.

In one embodiment, any plugin associated with location service 210 is configured to count messages received. If the messages received within a certain time frame is too great, the plugin can be configured to stop listening for messages. After a random amount of time the plugin can restart listening for messages again. If the number of messages is still too great, the plugin can perform an exponential back off. Specifically, as discussed above regarding plugin manager 412, each plugin can be configured to have similar checks and balances. Plugins can also be configured to check the information they receive to see if the information contains special characters that can be used to form executable code.

Security features of location service 210 can also include features adapted for applications 220. For example, location service 210 can be configured to include throttles on the number of requests an application can make for a current location and to register for notifications. Further, user access control lists can be maintained as an added data structure to prevent illegitimate users from changing service parameters and from reading, writing over, or using the profile information of other users as well as reading, writing over, or using the locations stored by other users.

In view of the many possible embodiments to which the principles of this invention can be applied, it will be recognized that the embodiment described herein with respect to the drawing figures is meant to be illustrative only and are not to be taken as limiting the scope of invention. For example, those of skill in the art will recognize that the elements of the illustrated embodiment shown in software can be implemented in hardware and vice versa or that the illustrated embodiment can be modified in arrangement and detail without departing from the spirit of the invention. Therefore, the invention as described herein contemplates all such embodiments as can come within the scope of the following claims and equivalents thereof.

We claim:

1. A method of operating a computer-implemented service on a computing device, the method comprising:
   receiving a request for a physical location of the computing device through a first application programming interface to the service;
   acquiring data based on a plurality of location reports from one or more location detection devices associated with the computing device, the location reports being received through a second application programming interface to the service;
   selectively providing the data through a third application programming interface to one or more resolver components, each resolver component being associated with a location detection device of the one or more location detection devices;
   receiving through the third application programming interface resolved acquired data;
   reconciling the resolved acquired data for any inconsistencies concerning the physical location of the device by applying at least one process to the acquired data; and
   generating a location object accessible to one or more applications, the location object including a reconciled physical location for the computing device,
   wherein the second and third APIs include at least one location API configured to specify functions to be implemented by a plug-in to register with the service.

2. The method of claim 1 wherein the process is one or more of a hierarchical, metric, string concatenation, union, intersection, uncertainty handling and inconsistency resolving process.

3. The method of claim 1 further comprising:
   in response to receiving the location reports, transmitting the acquired data through a third application programming interface to the service according to predetermined metrics to one or more resolvers that are available and capable of resolving the acquired data.

4. The method of claim 1 wherein generating the location object comprises encapsulating a reconciled physical location in the location object.

5. The method of claim 1 further comprising:
   transmitting the location object to the one or more applications according to a register of locations associated with the applications.

6. The method of claim 1 further comprises:
   assigning a priority to the acquired data according to a trustworthiness of a location report.

7. The method of claim 6 wherein the trustworthiness is assigned by a user.

8. The method of claim 6 wherein the trustworthiness is assigned by determining whether the location report has a secure digital signature.

9. The method of claim 1 wherein the receiving a request for a physical location includes:
   receiving a location identifier at a notification component.

10. The method of claim 1 wherein the one or more location detection devices include at least one of an 802.11 type provider, a network location awareness (NLA) provider, a global position service (GPS) provider, a General Packet Radio Service (GPRS) provider data, and a Bluetooth provider.

11. The method of claim 1 wherein the reconciling the acquired data includes applying one or more statistical processes to the acquired data to determine a most likely location context.

12. The method of claim 11 wherein the statistical processes include a weighted averaging of possible locations.

13. The method of claim 1 wherein the location object is generated by a fuser engine within the computer-implemented service.

14. A computer storage medium having computer-executable instructions implementing a service adapted to be run on a movable computer, the computer-executable instructions comprising:
- a location management component configured to route location data, the location management component adapted to:
  - provide a location provider application programming interface;
  - provide a location resolver application programming interface;
  - provide a cache component adapted to store location reports;
  - receive location data through the location provider application programming interface;
  - selectively provide the location data through the location resolver application programming interface;
  - receive resolved location data through the location resolver application programming interface;
  - access cached location data correlated with the received location data in the cache component; and
  - selectively output the cached data or the resolved location data, and wherein the location management component comprises:
    - a plug-in manager configured to route the location data through the location resolver application programming interface; and
    - a master resolver coupled to the plug-in manager, the master resolver configured to assign the location data to one or more resolvers appropriate for the location information;
- a fuser engine coupled to the location management component, the fuser engine configured to receive the outputs of the location management component as one or more location reports generated from the location data, reconcile conflicts between the location reports and generate a location object; and
- one or more location application programming interfaces (APIs) coupled to the location management component, at least one of the location application programming interfaces configured to transmit the location object from the fuser engine to an application, the location object configured to dynamically provide to the application a location for the computer running the service indicating movement of the computer, wherein the location APIs include at least one location API configured to specify functions to be implemented by a plug-in to register with the service.

15. The computer storage medium of claim 14 wherein at least one of the location APIs are coupled to at least one provider plug-in configured to receive the location data from a provider of raw location data, the provider plug-in configured to normalize the raw location data.

16. The computer storage medium of claim 14 wherein the location APIs include at least one location API configured to allow the application to query for the location of the computer running the service.

17. The computer storage medium of claim 14 wherein the location APIs include at least one location API configured to receive the location data from the fuser engine, the cache component, a plug-in manager and the location management component, said location API configured to pass the location data to the application.

18. The computer storage medium of claim 14 wherein the location APIs include at least one location API configured to allow parameters of the service to be configured.

19. The computer storage medium of claim 14 wherein the location APIs include at least one location API configured to add and remove plug-ins to the service.

20. The computer storage medium of claim 14 wherein the location APIs include at least one location API configured to allow the application to register for notification when the location of the computer running the service changes.

21. The computer storage medium of claim 14 wherein the location APIs include at least one location API configured to send and receive the location data to and from at least one plug-in, the plug-in configured to add rich content based on the location data and based on inferred context data.

22. The computer storage medium of claim 21 wherein the plug-in is a user-defined default plug-in.

23. A method of operating a service on a computing device to provide dynamic location information about the device to an application program, the method comprising:
- receiving through a first interface to the service a request for location context data concerning the device, the request being received from the application program;
- dynamically collecting through a second interface to the service location reports from one or more providers, each location report containing a type of location context data;
- determining through a programming interface types of resolvers available to operate on the location reports;
- selectively processing the location reports in resolvers based on the determined availability of resolvers, at least a portion of the location reports each being processed in a resolver a plurality of times, the processing in the resolvers generating resolved location reports, the resolved location reports indicating a physical location of the device, the selectively processing further comprising acts of:
  - routing, using a plug-in manager, location information through the programming interface; and
  - assigning, using a master resolver coupled to the plug-in manager, the location information to one or more resolvers appropriate for the location information;
- reconciling conflicting indications of the physical location of the device in the resolved location reports and the collected location reports; and
- returning to the application program reconciled location context data.

24. The method of claim 23 wherein the reconciling comprises applying a best guess function.

25. The method of claim 23 wherein the dynamically collecting location context data is performed by a location management component configured to collect the location context data and distribute the location context data for the reconciling.

26. The method of claim 25 wherein the location management component is configured to receive location context data from one or more providers and one or more resolvers.

27. The method of claim 26 wherein the providers include plug-ins that communicate raw location information to the location management component including wireless location data including one or more of an access point and a signal strength associated with the access point.

28. The method of claim 26 wherein the providers include plug-ins that communicate raw location information to the location management component including one or more of 802.11 type provider data, network location awareness provider data, GPS provider data, GPRS provider data, Bluetooth provider data, and active directory data.

29. The method of claim 28 wherein the active directory data includes media access control (MAC) address code identifying one or more locations of access points.

30. The method of claim 23 further comprising: storing the location context data in a database, the database configured to hold at least one of a history of the location context data, user-specific data, and application-specified data.

31. The method of claim 23 wherein the location context data includes:
   device specific location information previously transmitted to a provider from a sensor specific device;
   source specific information previously transmitted to a resolver from a service.

32. A computer storage medium having computer-executable instructions for enabling awareness of a location of a computing device, the computer-executable instructions performing acts comprising:
   receiving a request for a location of the computing device;
   acquiring data based on a plurality of location reports from one or more location detection devices associated with the computing device, at least a portion of the location reports being acquired through a programming interface to a provider plug-in component;
   routing, using a plug-in manager, location information through the programming interface;
   assigning, using a master resolver coupled to the plug-in manager, the location information to one or more resolvers appropriate for the location information;
   for each of the plurality of location reports:
      determining whether a resolved location report has been cached and when a cached resolved report is available, obtaining the cached resolved location report from a cache;
      when no resolved location report has been cached, determining whether a resolver plug-in component is available to resolve the location report and, when a resolver plug-in component is available, resolving the location report in the available plug-in component; and
      incrementing a counter and determining if the counter has reached a predetermined limit;
   reconciling the acquired data, including the resolved location context reports from a resolver plug-in and/or the cache, for any inconsistencies concerning the physical location of the computing device; and
   generating a location object accessible to one or more applications, the location object including a reconciled physical location for the computing device.

33. A method for generating rich location context reports from data received from at least one of a plurality of location providers, the plurality of location providers following a plurality of incompatible protocols, the method comprising:
   upon receiving a notification of availability of a set of location reports from one or more of the location providers, retrieving the set of location reports;
   for each location report in the set of location reports, determining whether a resolver is capable and available to interpret the location report and has not exceeded a predetermined number of iterations;
   if a resolver is capable, available and has not exceeded the predetermined number of iterations, transmitting the location report to the resolver;
   receiving through an application programming interface one or more rich location reports associated with the incompatible protocols from one or more resolvers
   combining the rich location reports into a set of rich location reports, each rich location report in the set of rich location reports according to a standardized data structure; and
   transmitting the set of rich location reports to a fuser engine.

34. The method of claim 33 further comprising:
   receiving from the fuser engine a location object; and
   writing the set of rich location reports to a notification service.

35. The method of claim 34 wherein the notification service is disposed within a file system.

36. The method of claim 33 wherein the predetermined number of iterations is configurable by a user via a user interface.

37. A computer storage medium having computer-executable instructions for enabling generation of rich location context reports from data received from at least one of a plurality of location providers, the plurality of location providers following a plurality of incompatible protocols awareness of a location context of a computer system, the computer-executable instructions performing acts comprising:
   upon receiving a notification of availability of a set of location reports from one or more of the location providers, retrieving the set of location reports;
   for each location report in the set of location reports, determining whether a resolver is capable and available to interpret the location report and has not exceeded a predetermined number of iterations;
   if a resolver is capable, available and has not exceeded the predetermined number of iterations, transmitting the location report to the resolver;
   receiving from one or more resolvers one or more rich location reports associated with the incompatible protocols;
   combining the rich location reports into a set of rich location reports, each rich location report in the set of rich location reports according to a standardized data structure; and
   transmitting the set of rich location reports to a fuser engine.

38. The computer readable medium of claim 37 wherein the acts further comprise: receiving from the fuser engine a location object; and notifying a notification dispatcher that the location object is available to one or more applications.

39. The computer readable medium of claim 37 wherein the acts further comprise transmitting the rich location reports to the fuser engine after a predetermined time.

40. The method of claim 39 wherein one or more of the predetermined time and the predetermined number of iterations are configurable by a user via a user interface.

* * * * *